US009013596B2

(12) United States Patent
Hong

(10) Patent No.: US 9,013,596 B2
(45) Date of Patent: Apr. 21, 2015

(54) AUTOMATIC ILLUMINANT ESTIMATION THAT INCORPORATES APPARATUS SETTING AND INTRINSIC COLOR CASTING INFORMATION

(75) Inventor: Li Hong, San Diego, CA (US)

(73) Assignee: Nikon Corporation, Tokyo (JP)

(*) Notice: Subject to any disclaimer, the term of this patent is extended or adjusted under 35 U.S.C. 154(b) by 432 days.

(21) Appl. No.: 13/119,574

(22) PCT Filed: Sep. 24, 2008

(86) PCT No.: PCT/US2008/077560
§ 371 (c)(1),
(2), (4) Date: Mar. 17, 2011

(87) PCT Pub. No.: WO2010/036246
PCT Pub. Date: Apr. 1, 2010

(65) Prior Publication Data
US 2011/0164150 A1    Jul. 7, 2011

(51) Int. Cl.
H04N 9/73     (2006.01)
H04N 5/228    (2006.01)
(Continued)

(52) U.S. Cl.
CPC .............. H04N 9/045 (2013.01); H04N 5/2354 (2013.01); H04N 9/735 (2013.01)

(58) Field of Classification Search
CPC .... H04N 9/735; H04N 5/2354; G06K 9/4652
USPC ............ 348/222.1, 223.1, 224.1, 225.1, 241; 382/162, 163, 164, 165, 166, 167, 168, 382/169, 170, 171, 172, 254
See application file for complete search history.

(56) References Cited

U.S. PATENT DOCUMENTS 5,752,106 A    5/1998  Yamano
6,038,339 A *  3/2000  Hubel et al. ............... 382/162
(Continued)

FOREIGN PATENT DOCUMENTS

WO    WO2010036240 A1    4/2010
WO    WO2010036246 A1    4/2010
(Continued)

OTHER PUBLICATIONS

PCT International Search Report and Written Opinion for PCT/US2008/077560 (related to present application) dated Dec. 12, 2008, Nikon Corporation.
(Continued)

Primary Examiner — Twyler Haskins
Assistant Examiner — Peter Chon
(74) Attorney, Agent, or Firm — Roeder & Broder LLP

(57) ABSTRACT

An image apparatus (10) for providing an estimated final illuminant of a scene (12) and subsequently providing an adjusted image (218) of a scene (12) includes a capturing system (226) and a control system (232). The capturing system (226) captures information for an input image (416) of the scene (12) while at an apparatus setting. The input image (416) is defined by a plurality of input colors. The control system (226) can compare at least one of the input colors to an illuminant database (245) that includes an illuminant gamut of observable colors for a plurality of possible illuminants, and can evaluate the apparatus setting to select one of the possible illuminants to be the estimated final illuminant. Examples of possible apparatus settings include an aperture size and an exposure time. With this design, the present invention is better able to distinguish between some possible outdoor illuminants and some possible indoor illuminants with improved accuracy. Additionally, the control system (226) can evaluate a consistency matching error for the plurality of possible illuminants to determine if the scene (12) has intrinsic color casting.

22 Claims, 14 Drawing Sheets

(51) Int. Cl.
*G06K 9/00* (2006.01)
*H04N 9/04* (2006.01)
*H04N 5/235* (2006.01)

(56) References Cited

U.S. PATENT DOCUMENTS

| | | | |
|---|---|---|---|
| 6,711,293 B1 | 3/2004 | Lowe | |
| 6,744,923 B1 | 6/2004 | Zabih et al. | |
| 6,973,212 B2 | 12/2005 | Boykov et al. | |
| 7,019,776 B1 | 3/2006 | Lin | |
| 7,421,121 B2 * | 9/2008 | Sachs et al. | 382/167 |
| 7,436,997 B2 * | 10/2008 | Ishigami et al. | 382/167 |
| 7,495,696 B2 * | 2/2009 | Chikane et al. | 348/223.1 |
| 7,720,371 B2 | 5/2010 | Hong et al. | |
| 7,728,880 B2 * | 6/2010 | Hung et al. | 348/223.1 |
| 7,889,207 B2 | 2/2011 | Hong et al. | |
| 8,229,215 B2 * | 7/2012 | Li | 382/167 |
| 2002/0113881 A1 | 8/2002 | Funston et al. | |
| 2004/0008886 A1 | 1/2004 | Boykov | |
| 2004/0201766 A1 | 10/2004 | Funston et al. | |
| 2004/0258305 A1 | 12/2004 | Burnham et al. | |
| 2005/0169519 A1 | 8/2005 | Minakuti et al. | |
| 2005/0271273 A1 | 12/2005 | Blake et al. | |
| 2007/0031037 A1 | 2/2007 | Blake et al. | |
| 2008/0025627 A1 | 1/2008 | Freeman et al. | |
| 2008/0101690 A1 * | 5/2008 | Hsu et al. | 382/162 |
| 2008/0175508 A1 | 7/2008 | Bando et al. | |
| 2008/0175576 A1 | 7/2008 | Hong | |
| 2008/0219549 A1 | 9/2008 | Dolan et al. | |
| 2010/0086206 A1 | 4/2010 | Hong | |
| 2010/0260431 A1 | 10/2010 | Tezaur | |
| 2010/0266218 A1 | 10/2010 | Tezaur | |
| 2010/0272356 A1 | 10/2010 | Hong | |
| 2010/0316305 A1 | 12/2010 | Hong | |
| 2011/0019909 A1 | 1/2011 | Farid et al. | |
| 2011/0019932 A1 | 1/2011 | Hong | |

FOREIGN PATENT DOCUMENTS

| WO | WO2010036247 A1 | 4/2010 |
|---|---|---|
| WO | WO2010036248 A1 | 4/2010 |
| WO | WO2010036249 A1 | 4/2010 |
| WO | WO2010036250 A1 | 4/2010 |
| WO | WO2010036251 A1 | 4/2010 |

OTHER PUBLICATIONS

Murali Subbarao, Tae Choi, Arman Nikzad, "Focusing Techniques", Tech. Report Sep. 4, 1992, Dept. of Electrical Engineering, State Univ. of NY at Stony Brook, Stony Brook, NY 11794-2350.

Agarwala et al., "Interactive digital photomontage", pp. 1-9, Proceedings of ACM SIGGRAPH 2004, http://grail.cs.washington.edu/projects/photomontage.

Li Hong and George Chen, "Segment-based Stereo Matching Using Graph Cuts", 0-7695-2158-4/04 (C) 2004 IEEE, Proceedings of IEEE computer vision and pattern recognition 2004.

Milan Mosny et al., Multispectral color constancy: real image tests, School of Computing Science, Simon Fraser University, Burnaby, BC, Canada V5A 1S6, Human Vision and Electronic Imaging XII, SPIE vol. 6492, Jan. 2007, San Jose, CA (Copyright SPIE 2007).

M. Bertero and P. Boccacci, A Simple Method for the Reduction of Boundary Effects in the Richardson-Lucy Approach to Image Deconvolution, Mar. 17, 2005, Astronomy and Astrophysics manuscript No. aa2717-05, DISI, University of Genova, Genova Italy.

David S.C. Biggs and M. Adrews, Acceleration of Iterative Image Restoration Algorithms, Mar. 10, 1997, vol. 36, No. 8 pp. 1766-1775, Applied Optics, Optical Society of America, US.

Robert J. Hanisch et al., Denconvolution of Hubble Space Telescope Images and Spectra, Space Telescope Science Institute, Baltimore, MD, 1997, Chapter 10, pp. 310-361, Deconvolution of Images and Spectra Second Edition, Acadamic Press, Space Telescope Science Institute, Baltimore, Maryland, US.

L. B. Lucy, An Iterative Technique for the Rectification of Observed Images, The Astronomical Journal, 1974, vol. 79: pp. 745-754, University of Chicago, US.

W.H. Richardson, Bayesian-based Iterative Method of Image Restoration, J. Opt. Soc. Am., 1972, vol. 62, pp. 55-59, NW Washington, DC, US.

Advance E-mail PCT Notification Concerning Transmittal of Preliminary Report on Patentability, along with Written Opinion dated Dec. 12, 2008 for PCT/US2008/077560 (related to the present application), publication date Apr. 7, 2011, Nikon Corporation.

* cited by examiner

| Non-redundant Input colors 571 | First Possible Illuminant 364A Separation Distance 570 | Second Possible Illuminant 364B Separation Distance 570 | ... | N Possible Illuminant Separation Distance 570 |
|---|---|---|---|---|
| I.C. 1 | 0 | 0 | | 0 |
| I.C. 2 | 5 | 0.5 | | 0 |
| I.C. 3 | 4 | 2 | | 0 |
| I.C. 4 | 10 | 2 | | 0.1 |
| I.C. 5 | 4.5 | 2 | | 0.5 |
| ... | | | | |
| I.C. N | 2 | 1 | | 0 |
| Total Consistency Error | 198 | 120 | | 15 |

Fig. 5C

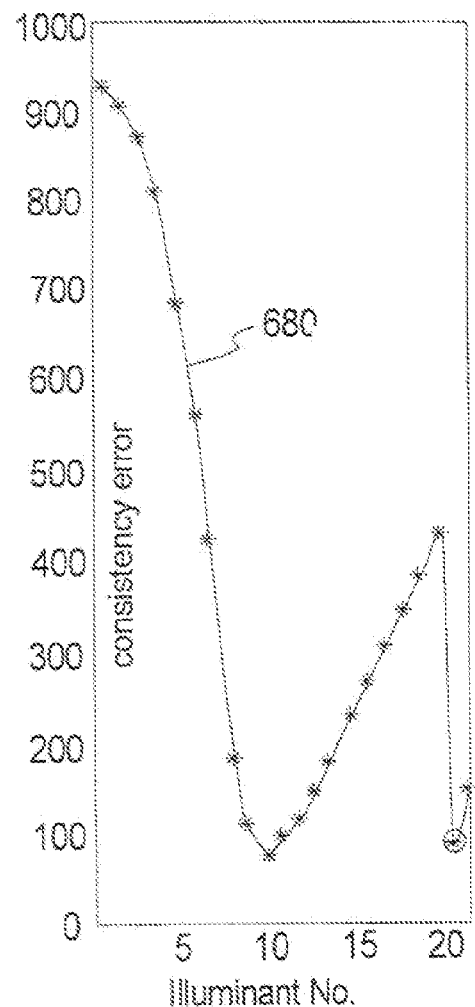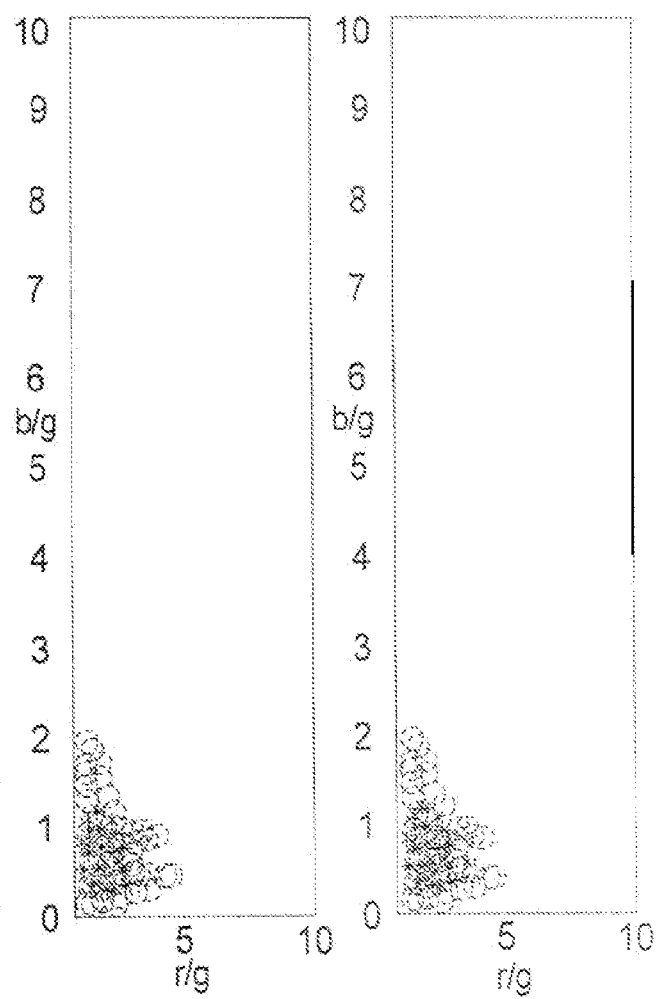
Fig. 6A   Fig. 6B   Fig. 6C

AUTOMATIC ILLUMINANT ESTIMATION THAT INCORPORATES APPARATUS SETTING AND INTRINSIC COLOR CASTING INFORMATION

BACKGROUND

Cameras are commonly used to capture an image of a scene. Most scenes are not illuminated by a 100% pure white illuminant. For example, sunlight at midday is much closer to white than the late afternoon or morning sunlight which includes more yellow. The color of light reflected from an object will vary according to the color of the illuminant that is illuminating the scene. As a result thereof, for example, if the illuminant produces light that includes a lot of yellow, a white object in the scene will not be captured as a white object with a typical film type camera. This is commonly referred to as illuminant color casting because the illuminant causes the color casting.

Another type of color casting on the scene is caused by the intrinsic colors in the scene. For example, if the scene only contains green grass, the captured image of the scene will show greenish color casting. In another example, if the scene only contains blue sky, the captured image of the scene will show bluish color casting. This is generally referred to as intrinsic color casting.

Recently, some digital cameras include a program that first estimates the color of the illuminant, and subsequently adjusts all of the colors in an input image according to the color of the illuminant. This is commonly referred to as white balance correction. With white balance correction, the digital camera attempts to compensate for variations in the colors in the input image caused by an off-white illuminant, and the actual color of the objects in the scene are more accurately represented in the provided image.

Unfortunately, existing white balance correction programs have not been able to quickly and accurately estimate the correct illuminant in all situations. For example, many programs have difficulty distinguishing between some daylight illuminants and fluorescent illuminants. Moreover, many programs have difficulty accurately estimating the correct illuminant when the scene has intrinsic color casting. As a result thereof, the color correction is not satisfactory in all situations. Further, some white balance correction programs are extremely complex to implement and are computationally expensive.

SUMMARY

The present invention is directed to an image apparatus for providing an estimated final illuminant of a scene and subsequently providing an adjusted image of a scene. The image apparatus includes a capturing system and a control system. The capturing system captures information for an input image of the scene while at an apparatus setting. The input image is defined by a plurality of input colors. In one embodiment, the control system compares at least one of the input colors to an illuminant database that includes an illuminant gamut of observable colors for a plurality of possible illuminants, and evaluates the apparatus setting to select one of the possible illuminants to be the estimated final illuminant. Examples of possible apparatus settings include an aperture size and an exposure time. With this design, the present invention is able to distinguish between some possible outdoor illuminants and some possible indoor illuminants with improved accuracy.

The control system can determine a separation distance between the at least one input color and a closest observable color for each possible illuminant to obtain a consistency matching error for each of the possible illuminants. Further, the control system can select the possible illuminant with the best consistency matching error as an estimated initial illuminant.

In one embodiment, the plurality of possible illuminants includes a plurality of possible indoor illuminants and a plurality of possible outdoor illuminants. In this embodiment, the control system evaluates the apparatus setting to determine if the apparatus setting indicates an outdoor illuminant or an indoor illuminant.

In one example, if the estimated initial illuminant is an indoor illuminant and the apparatus setting indicates an indoor illuminant, the control system selects the estimated initial illuminant as the estimated final illuminant. In another example, if the estimated initial illuminant is an indoor illuminant and the apparatus setting indicates an outdoor illuminant, the control system can select an outdoor illuminant from the plurality of possible illuminants that has the best consistency matching error.

Somewhat similarly, if the estimated initial illuminant is an outdoor illuminant and the apparatus setting indicates an outdoor illuminant, the control system selects the estimated initial illuminant as the estimated final illuminant. In yet another example, if the estimated initial illuminant is an outdoor illuminant and the apparatus setting indicates an indoor illuminant, the control system can select an indoor illuminant from the plurality of possible illuminants that has the best consistency matching error.

Additionally or alternatively, the control system can compare at least one of the input colors to an illuminant database that includes an illuminant gamut of observable colors for a plurality of possible illuminants, and can evaluate if the scene has intrinsic color casting. With this design, the estimated final illuminant is estimated with improved accuracy when the scene has intrinsic color casting.

In one embodiment, the control system evaluates the consistency matching error for each of the possible illuminants to determine if the scene has intrinsic color casting. In this design, if the control system selects the possible illuminant with the best consistency matching error as an estimated initial illuminant and if the control system determines that the scene does not have intrinsic color casting, the control system selects the estimated initial illuminant as the estimated final illuminant. Alternatively, if the control system selects the possible illuminant with the best consistency matching error as an estimated initial illuminant and if the control system determines that the scene has intrinsic color casting, the control system selects one of the possible illuminants near the estimated initial illuminant as the estimated final illuminant.

Additionally, the control system can perform a test based on the colors or chromaticity colors of the input image to determine if color casting exists in the input image.

With the present design, the control system provides an estimated final illuminant from the illuminant database with improved accuracy. As a result thereof, the control system can apply the correct level of color adjustment to the input image to provide an adjusted image that accurately approaches the true colors in the scene. As utilized herein, the terms "true colors" or "actual colors" shall mean the colors that are present at the scene when the scene is illuminated by a white light, such as standard illuminant D65.

Moreover, the present invention is also directed to one or more methods for providing an estimated final illuminant of a scene and subsequently providing an adjusted image of the scene.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 5C is a chart that includes a non-redundant list of input colors and their respective separation distances for a plurality of possible illuminants;

FIG. 6A is a simplified consistency matching curve for a first input image;

FIG. 6B is a simplified graph that illustrates both the gamut of observable colors for a first illuminant, and non-redundant input colors for the first input image;

FIG. 6C is a simplified graph that illustrates both the gamut of observable colors for a second illuminant, and non-redundant input colors for the first input image;

FIG. 11 is a simplified illustration of another embodiment of an image apparatus having features of the present invention.

DESCRIPTION

Figure 1:
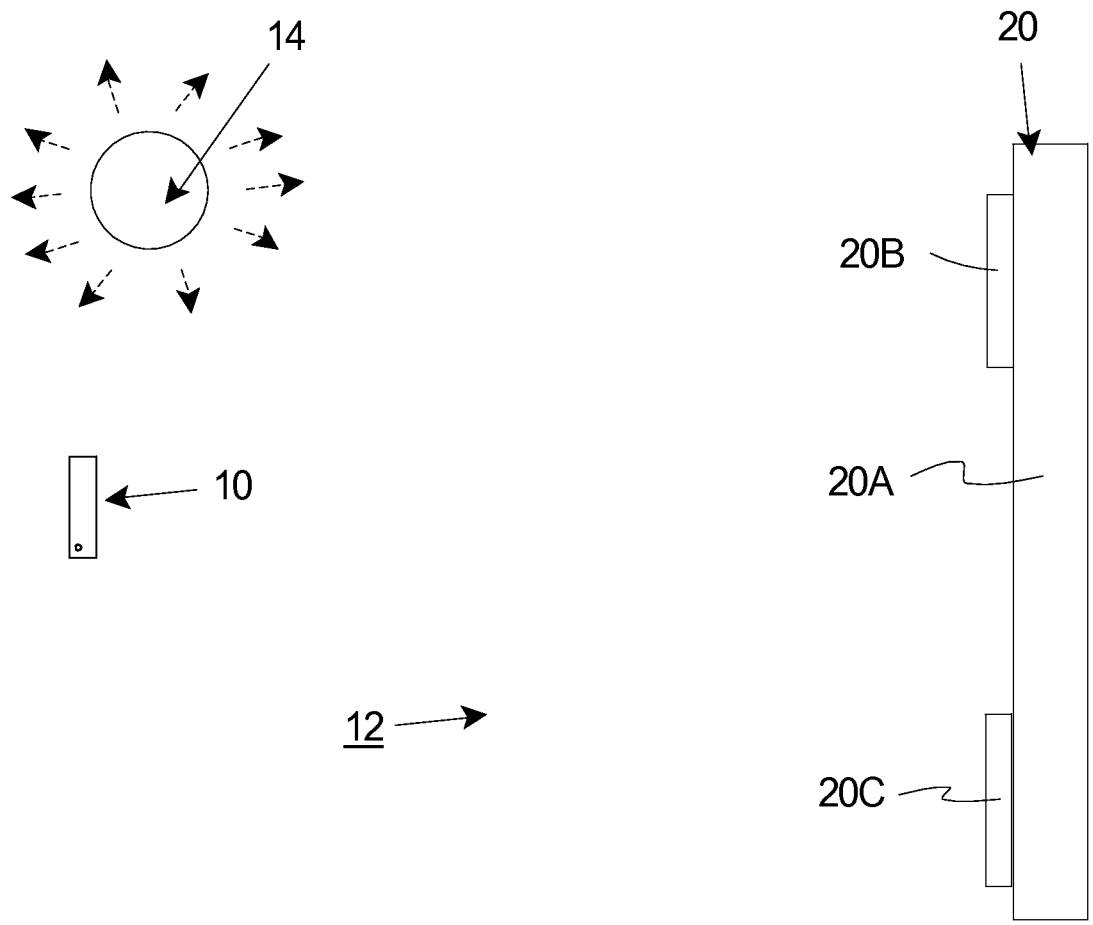
FIG. 1 is a simplified top plan view of a scene and an image apparatus having features of the present invention.

FIG. 1 is a simplified top plan illustration of an image apparatus 10 and a scene 12 that is illuminated by an illuminant 14. The image apparatus 10 is designed to (i) capture an input image (illustrated in FIG. 4), (ii) evaluate the input image 416 to estimate the illuminant, and (iii) perform white balance adjustment on the input image 416 based on the estimated final illuminant to provide an adjusted image 218 (illustrated in FIG. 2B). As an overview, in certain embodiments, the image apparatus 10 uses an illuminant estimation method that estimates the illuminant with improved accuracy, and the illuminant estimation method can be performed with relative simple calculations and implementation. As a result thereof, the image apparatus 10 is more likely to correctly estimate the illuminant, the image apparatus 10 is more likely to provide the correct color correction, and the adjusted image 218 more accurately approaches the true colors in the scene 12.

Additionally, the present invention can include one or more methods for distinguishing between some possible indoor illuminants and some possible outdoor illuminants with improved accuracy. Moreover, the present invention can include one or more methods for more accurately estimating the correct illuminant when the scene 12 has intrinsic color casting.

The type of scene 12 captured by the image apparatus 10 can vary. For example, the scene 12 can include one or more objects 20, e.g. animals, plants, mammals, and/or environments. For simplicity, in FIG. 1, the scene 12 is illustrated as including three objects 20. Alternatively, the scene 12 can include more than three or less than three objects 20.

In FIG. 1, one of the objects 20 is a wall 20A, one of the objects 20 is a first painting 20B attached to the wall 20A, and one of the objects 20 is a second painting 20C attached to the wall 20A.

The design and location of the illuminant 14 that illuminates the scene 12 can vary greatly. In FIG. 1, the illuminant 14 is a fluorescent lamp positioned away from the wall 20A. Non-exclusive examples, of other possible illuminants 14 can include (i) the sun at sunrise with a clear sky, (ii) the sun at sunset with a clear sky, (iii) the sun at midday with a clear sky, (iv) an electronic flash, (v) a flashlight, (vi) the sun with a moderately overcast sky, (vii) the sun with shade or a heavily overcast sky, (viii) an incandescent bulb, or (ix) a candle.

As is known, the color of light reflected from the objects 20 will vary according to the color temperature of the illuminant 14 that is illuminating the object 20. Accordingly, the color of each object in the input image 416 will depend upon the characteristics of the illuminant 14. Stated in another fashion, the color cast by each of the objects 20 is related to the characteristics of the illuminant 14.

In FIG. 1, the illuminant 14 is positioned outside the scene 12. Alternatively, the illuminant 14 can be part of the scene 12 captured by the image apparatus 10.

In certain embodiments, the image apparatus 10 is water resistant and is adapted to capture images of scenes that are partly or fully in a liquid such as water. Alternatively, the image apparatus 10 can be enclosed by an outer shell (not shown) that surrounds and encloses the image apparatus 10 and that provides a watertight barrier around the image apparatus 10.

Figure 2A:
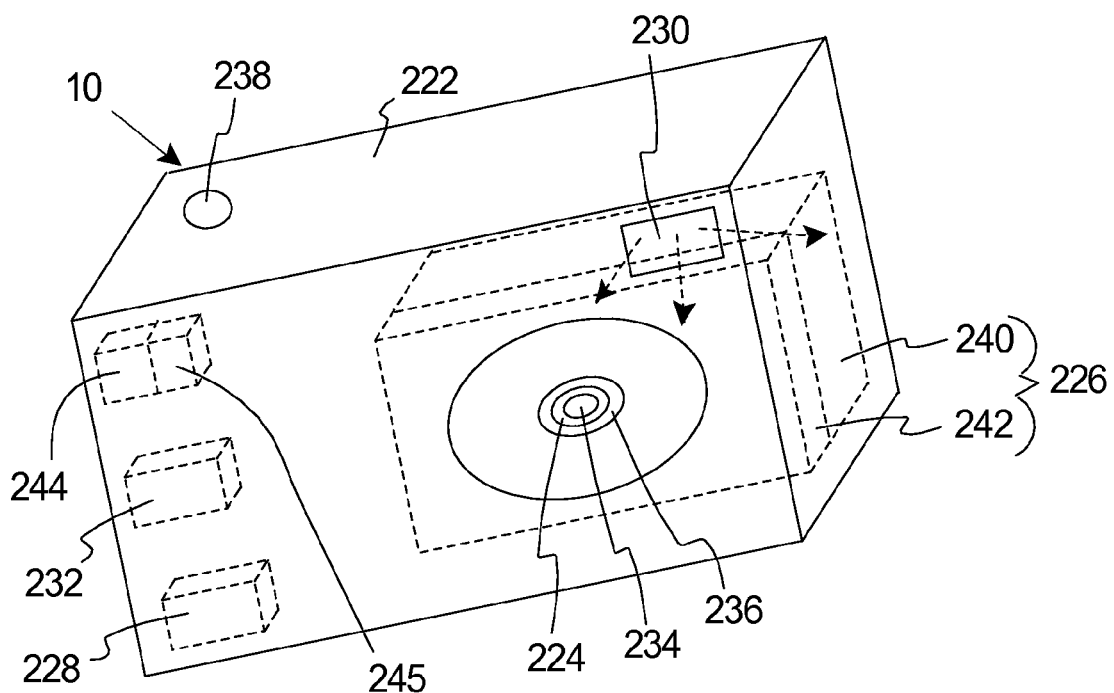
FIG. 2A is a simplified front perspective view of one embodiment of the image apparatus.

FIG. 2A illustrates a simplified, front perspective view of one, non-exclusive embodiment of the image apparatus 10. In this embodiment, the image apparatus 10 is a digital camera, and includes an apparatus frame 222, an optical assembly 224, a capturing system 226 (illustrated as a box in phantom), a power source 228 (illustrated as a box in phantom), a flash system 230, and a control system 232 (illustrated as a box in phantom). The design of these components can be varied to suit the design requirements and type of image apparatus 10. Further, the image apparatus 10 could be designed without one or more of these components. For example, the image apparatus 10 could be designed without the flash system 230.

The apparatus frame 222 can be rigid and support at least some of the other components of the image apparatus 10. In one embodiment, the apparatus frame 222 includes a generally rectangular shaped hollow body that forms a cavity that receives and retains at least a portion of the capturing system 226.

The apparatus frame 222 can include an aperture 234 and a shutter mechanism 236 that work together to control the amount of light that reaches the capturing system 226. In certain embodiments, the size of the aperture 234 is automatically adjustable by the control system 232 to control the amount of light that reaches the capturing system 226.

The shutter mechanism 236 can be activated by a shutter button 238. The shutter mechanism 236 can include a pair of blinds (sometimes referred to as "blades") that work in conjunction with each other to allow the light to be focused on the capturing system 226 for a certain amount of time ("exposure time"). Alternatively, for example, the shutter mechanism 236 can be all electronic and contain no moving parts. For example, an electronic capturing system 226 can have the exposure time controlled electronically to emulate the functionality of the blinds. In one embodiment, the exposure time is automatically adjustable by the control system 232 to control the amount of light that reaches the capturing system 226.

In certain embodiments, the information regarding an aperture size of the optical assembly 224 and/or the exposure time can be used in the illuminant estimation method to improve the accuracy of the illuminant estimation method. As used herein, the term "apparatus setting or apparatus setting information" can refer to one or both the aperture size and the exposure time. Additionally, the apparatus setting information can include the flash light setting information (on/off). In this example, the estimation can be influenced by whether the flash is on, or whether the flash is off.

The optical assembly 224 can include a single lens or a combination of lenses that work in conjunction with each other to focus light onto the capturing system 226. In one embodiment, the image apparatus 10 includes an autofocus assembly (not shown) including one or more lens movers that move one or more lenses of the optical assembly 224 in or out until the sharpest possible image of the subject is received by the capturing system 226. Further, the aperture size of the optical assembly 224 can be selectively adjusted by the control system 232 to adjust the amount of light that is directed onto the capturing system 226.

The capturing system 226 captures information for the input image 416. The design of the capturing system 226 can vary according to the type of image apparatus 10. For a digital type camera, the capturing system 226 includes an image sensor 240 (illustrated in phantom), a filter assembly 242 (illustrated in phantom), and a storage system 244 (illustrated in phantom).

The image sensor 240 receives the light that passes through the aperture 234 and converts the light into electricity. One non-exclusive example of an image sensor 240 for digital cameras is known as a charge coupled device ("CCD"). An alternative image sensor 240 that may be employed in digital cameras uses complementary metal oxide semiconductor ("CMOS") technology.

The image sensor 240, by itself, produces a grayscale image as it only keeps track of the total intensity of the light that strikes the surface of the image sensor 240. Accordingly, in order to produce a full color image, the filter assembly 242 is necessary to capture the colors of the image.

It should be noted that other designs for the capturing system 226 can be utilized. It should also be noted, as discussed in more detail below, that with information from the capturing system 226, the control system 232 can selectively compensate the colors in the raw input image 416.

The storage system 244 stores the various images before the images are ultimately printed out, deleted, transferred or downloaded to an auxiliary compensation system (not shown in FIG. 2A), an auxiliary storage system or a printer. The storage system 244 can be fixedly or removably coupled to the apparatus frame 222. Non-exclusive examples of suitable storage systems 244 include flash memory, a floppy disk, a hard disk, or a writeable CD or DVD.

The power source 228 provides electrical power to the electrical components of the image apparatus 10. For example, the power source 228 can include one or more chemical batteries, either the one time use disposable batteries (such as alkaline, zinc-air), or the multiple use rechargeable batteries (such as nickel-cadmium, nickel-metal-hydride, lead-acid, lithium-ion).

The flash system 230 provides a flash of light that can be used to selectively illuminate at least a portion of the scene 12 (illustrated in FIG. 1).

In one embodiment, the control system 232 is electrically connected to and controls the operation of the electrical components of the image apparatus 10. The control system 232 can include one or more processors and circuits and the control system 232 can be programmed to perform one or more of the functions described herein. In FIG. 2A, the control system 232 is coupled to the apparatus frame 222 and is positioned within the apparatus frame 222.

Additionally, as provided herein, the control system 232 includes software that evaluates the input colors from the input image 416 of the scene and uses an illuminant estimation procedure to estimate the illuminant. Subsequently, the control system 232 can adjust the color of the input image 416 based on the estimated illuminant to provide the adjusted image 218.

In one embodiment, an illuminant database 245 (illustrated as a box) is stored in the storage system 244 for access by the control system 232 during the illuminant estimation procedure. The illuminant database 245 stores a separate gamut of all observable colors for each of a plurality of possible illuminants. For example, the illuminant database 245 can store a separate gamut of all possible colors for at least approximately 5, 10, 15, 20, 25, 30, 35, 40, 50, or more different possible illuminants. Typically, the accuracy of the estimation increases as the number of possible illuminants in the illuminant database is increased. In one embodiment, the illuminant database 245 includes (i) a separate gamut of all observable colors for each of a plurality of possible outdoor illuminants, and (ii) a separate gamut of all observable colors for each of a plurality of possible indoor illuminants.

Non-exclusive, specific examples for possible illuminants in the illuminant database 245 can include (i) the gamut of observable colors from a fluorescent light, (ii) the gamut of observable colors from an incandescent light, (iii) the gamut of observable colors from a candlelight, (iv) the gamut of observable colors from the sun at sunrise with a clear sky, (v) the gamut of observable colors from the sun at sunset with a clear sky, (vi) the gamut of observable colors from the sun at midday with a clear sky, (vii) the gamut of observable colors from an electronic flash, (viii) the gamut of observable colors from a flashlight, (ix) the gamut of observable colors from the sun with a moderately overcast sky, and/or (x) the gamut of observable colors from the sun with shade or a heavily overcast sky. It should be noted that (i)-(iii) are indoor illuminants while (iv)-(x) are outdoor illuminants.

Figure 2B:
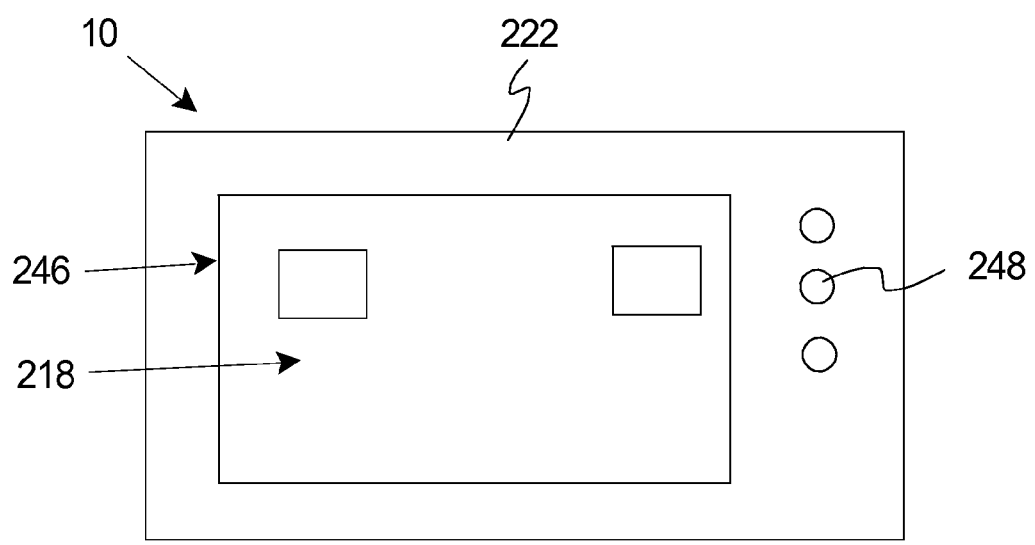
FIG. 2B is a simplified rear view of the image apparatus of FIG. 2A and an adjusted image of the scene of FIG. 1.

Referring to FIG. 2B, the image apparatus 10 can include an image display 246 which displays the adjusted image 218 and/or the raw input image. With this design, the user can decide which adjusted images 218 should be stored and which adjusted images 218 should be deleted. In FIG. 2B, the image display 246 is fixedly mounted to the apparatus frame 222 on the back side. Alternatively, the image display 246 can be secured to the apparatus frame 222 with a hinge mounting system (not shown) that enables the display to be pivoted away from the apparatus frame 222. One non-exclusive example of an image display 246 includes an LCD screen.

Further, the image display 246 can display other information such as the time of day, and the date.

Moreover, the image apparatus 10 can include one or more control switches 248 electrically connected to the control system 232 that allows the user to control the functions of the image apparatus 10. Additionally, one or more of the control switches 248 can be used to selectively switch the image apparatus 10 to the white balance adjustment mode in which one or more of the adjustment features disclosed herein is activated.

Figure 3A:
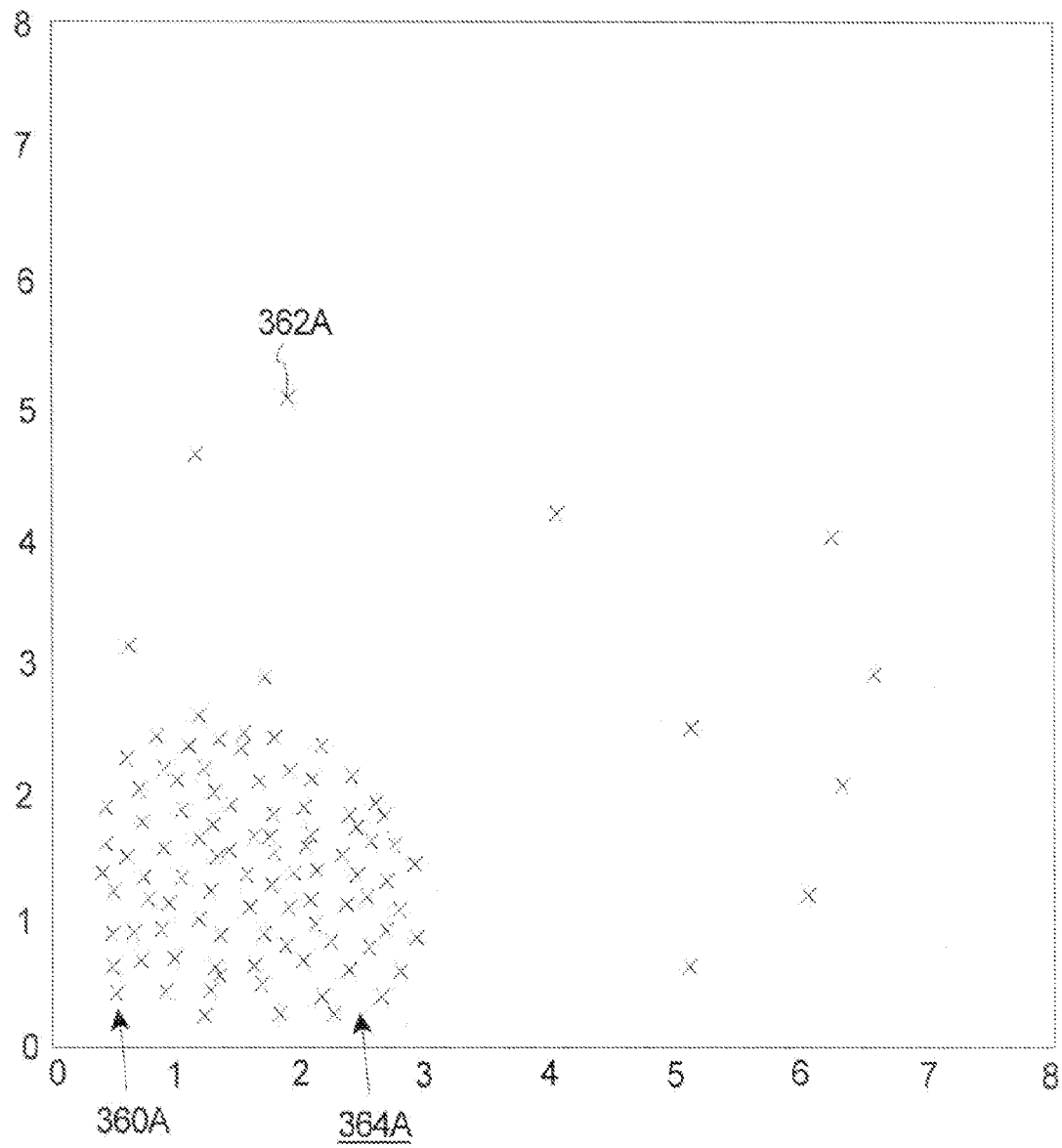
FIG. 3A is graph that illustrates a gamut of observable colors for a first possible illuminant.
Figure 3B:
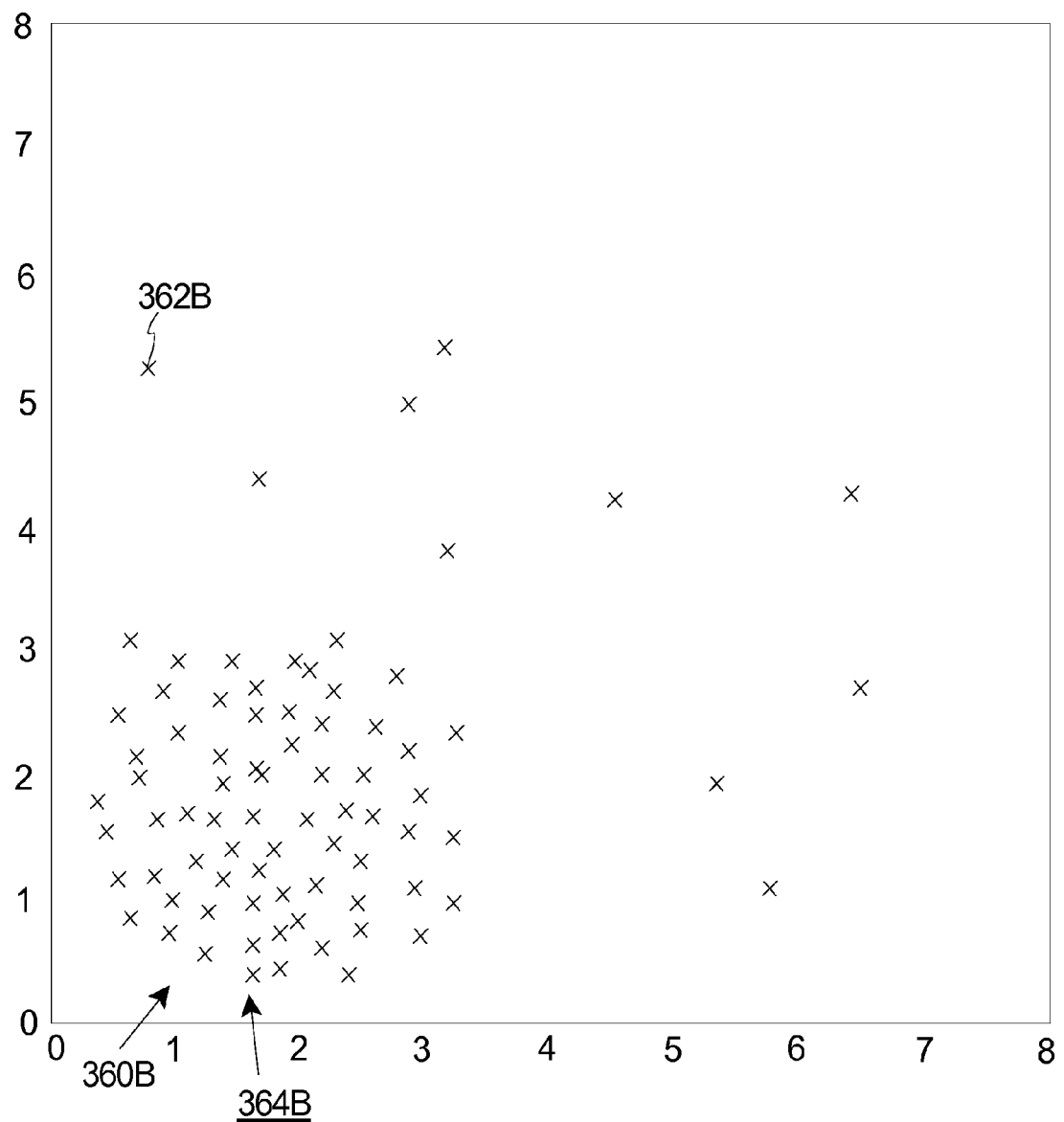
FIG. 3B is graph that illustrates a gamut of observable colors for a second possible illuminant.

FIG. 3A is a simplified graph that illustrates a gamut 360A of observable colors (represented as "X") 362A for a first possible illuminant 364A. Somewhat similarly, FIG. 3B is simplified graph that illustrates a gamut 360B of observable colors (represented as "X") 362B for a second possible illuminant 364B. These gamuts 360A, 360B can be just two possible examples of the plurality of gamuts that are stored in the storage system 244.

It should be noted that the gamuts 360A, 360B illustrated in FIGS. 3A and 3B are merely examples that were created to facilitate this discussion and are not the observable colors 362A, 362B for any actual illuminant. Further, depending upon the characteristics of the illuminant 364A, 364B, the gamuts 360A, 360B can include greater or fewer observable colors 362A, 362B than those illustrated in FIGS. 3A and 3B. For example, a typical illuminant 364A, 364B can have a gamut 360A, 360B of between approximately hundreds and thousands of observable colors 362A, 362B (depending upon sampling rate of the color space.

In one embodiment, each gamut 364A, 364B in the illuminant database 245 of observable colors is expressed in the chromatic scale. The chromaticity space should generate a relatively large separation among the different possible illuminants. The exact chromatic scale can be selected to achieve the best performance and implementation efficiency of the system. For example, the chromatic scale can be (i) rb (r/g, b/g); (ii) rg (r/b, g/b); (iii) bg (b/r, g/r); (iv) rgb_rb (r/r+g+b, b/r+g+b); (v) rgb_rg (r/r+g+b, g/r+g+b); or (vi) rgb_bg (b/r+g+b, g/r+g+b).

To reduce computational complexity and data storage requirements, the chromaticity space should have uniform sampling for easy data manipulation. A low sampling rate to discretize the chromaticity space can also be desired for lower storage requirement and lower computational load by the control system. In general, chromaticity spaces with better separation among the different illuminants should result in better illuminant estimation accuracy.

In FIGS. 3A and 3B, each gamut 360A, 360B is illustrated in two dimensions. Alternatively, for example, each gamut can be in RGB real scale space, or 3-d RGB chromaticity space.

In certain embodiments, the performance of the illuminant estimation is strongly dependent on the accuracy of the illuminant gamuts 360A, 360B in the illuminant database 245. One way to build the illuminant database 245 includes directly taking pictures for various illuminants and various scenes. Another way to build the illuminant database 245 is to synthesize the observable illuminant colors for each possible illuminant. Yet another way to build the illuminant database 245 is a combination of both real life images and synthesized colors.

In one embodiment, the illuminant gamut for each of the plurality of possible illuminants is pre-generated and is transferred to the storage system 244 (illustrated in FIG. 2A) of the image apparatus 10 for access by the control system 232.

Figure 4:
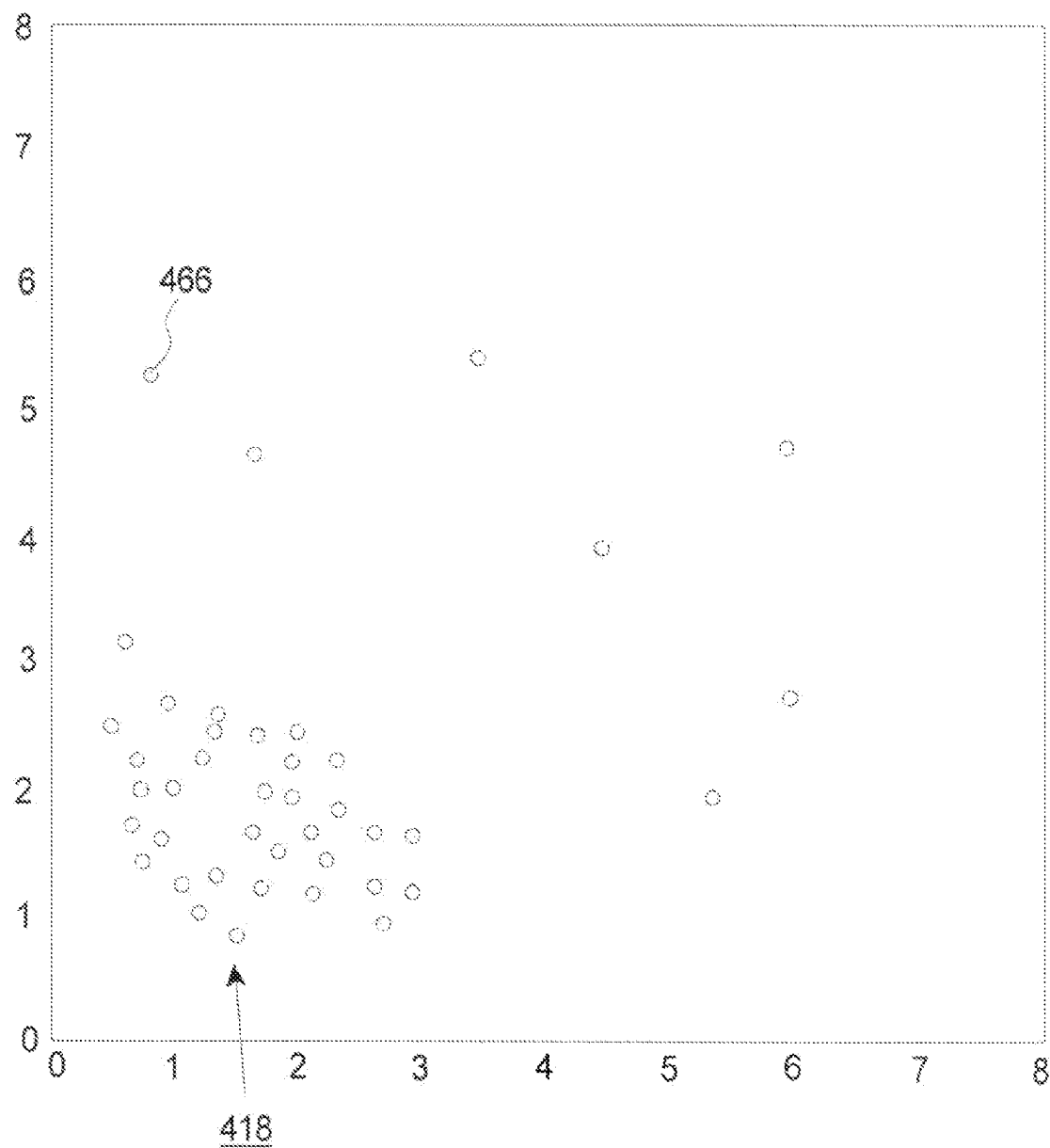
FIG. 4 is graph that illustrates input colors for an input image.

FIG. 4 is a simplified graph that illustrates non-redundant input colors 466 (represented as "O") for an input image 418. In this example, after the input image 416 is captured, the control system 232 determines the input color 466 at each pixel of the input image 416, and generates a list of input colors 466. Next, the control system 232 reduces the list of input colors 466 to a non-redundant list 571 (illustrated in FIG. 5C) of input colors 466. These non-redundant input colors 466 are illustrated in FIG. 4. The input colors 466 illustrated in FIG. 4 are merely an example of possible input colors 466 that was created to facilitate this discussion. Further, depending upon the characteristics of the scene 12, the input image 416 can include greater or fewer non-redundant input colors 466 and the distribution of these input colors 466 can be different than those illustrated in FIG. 4. For example, a typical input image 416 can include between approximately tens and hundreds of non-redundant input colors 466.

In one embodiment, the input colors 466 are expressed in the same chromatic scale as the gamuts 360A, 360B of possible illuminants 364A, 364B. Alternatively, for example, the input colors 466 can be in RGB space and in three dimensions as long as the color space of the input colors 466 is the same as the color space of the illuminant gamuts 360A, 360B.

Figure 5A:
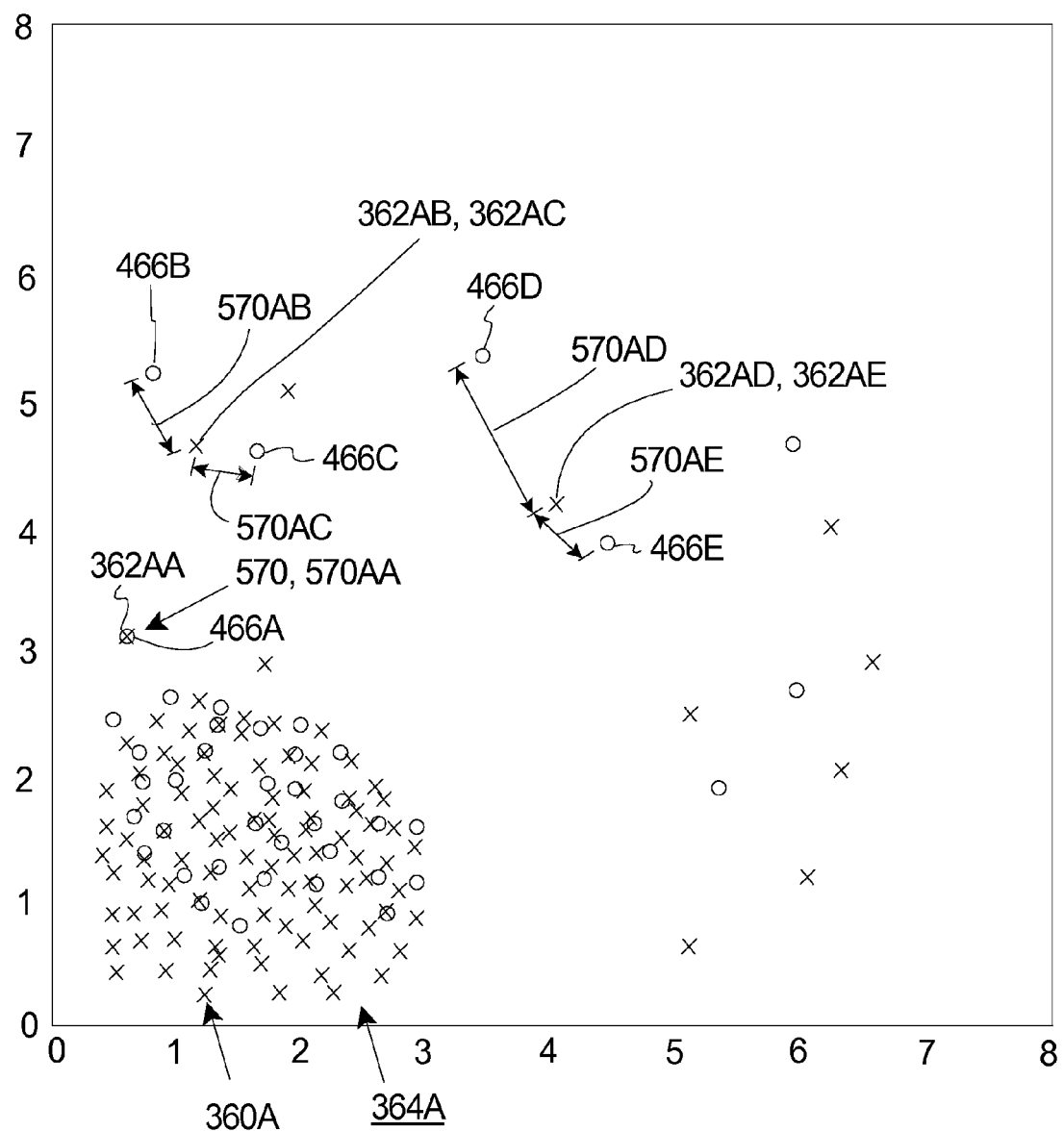
FIG. 5A is graph that illustrates both the gamut of observable colors for the first possible illuminant and the input colors for the input image.

FIG. 5A is a simplified graph that illustrates both the gamut 360A of observable colors (represented as "X") 362A for the first possible illuminant 364A and the non-redundant input colors 466 (represented as "O") for the input image 416. Somewhat similarly, FIG. 5B is simplified graph that illustrates both the gamut 360B of observable colors (represented as "X") 362B for the second possible illuminant 364B and the non-redundant input colors 464 (represented as "O") for the input image 416.

Figure 5B:
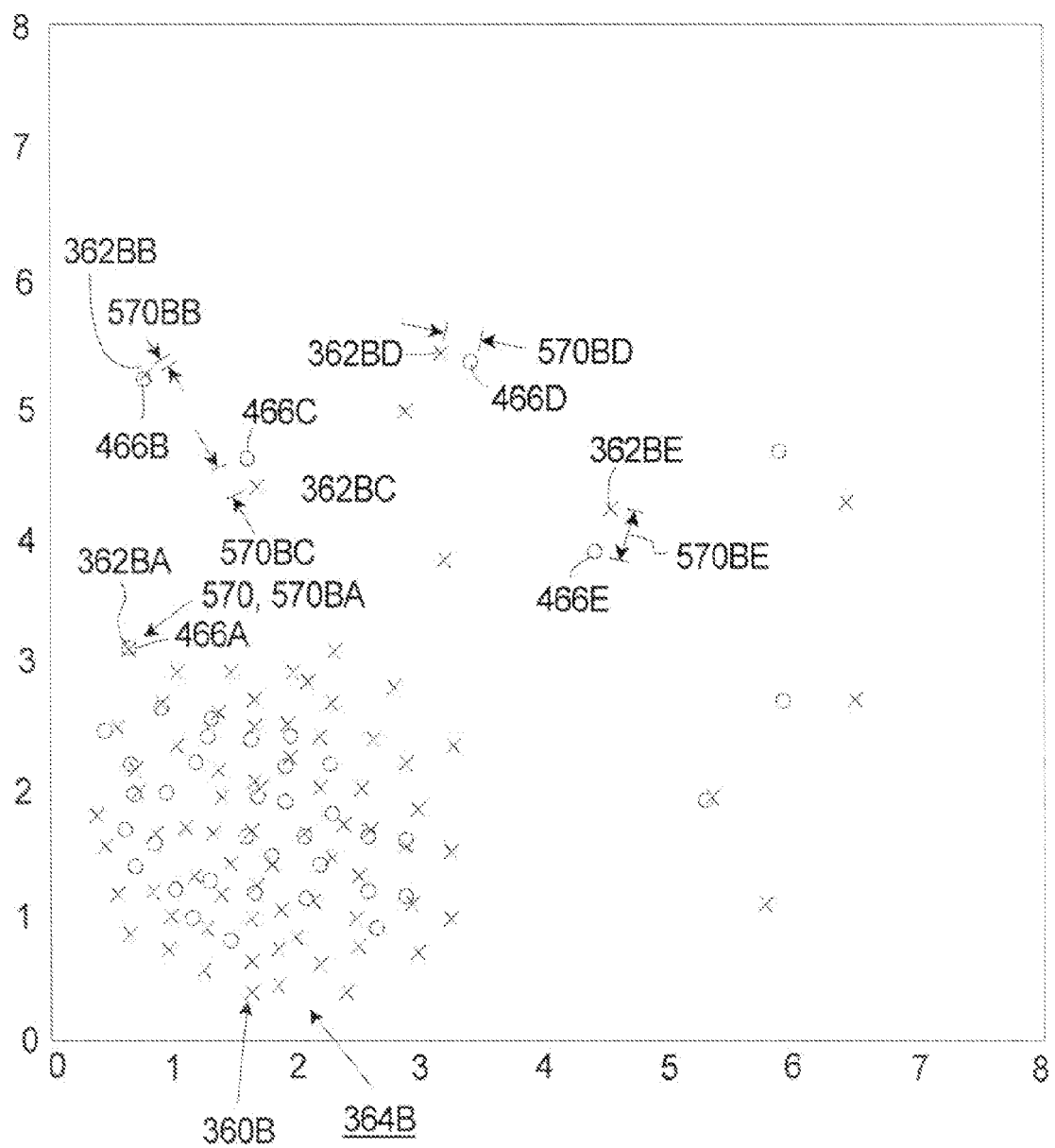
FIG. 5B is graph that illustrates both the gamut of observable colors for the second possible illuminant and the input colors for the input image.

FIGS. 5A and 5B facilitate the discussion on how the control system 232 (illustrated in FIG. 2A) initially estimates the possible illuminant. As provided herein, in certain embodiments, the control system 232 uses software that directly computes and determines a consistency matching error and compares each of the non-redundant input colors 466 to the respective closest observable 362A, 362B for each of the possible illuminants 364A, 364B in the illuminant database 245. In this embodiment, the control system 232 determines a separation distance 570 between each individual input color 466 and a closest observable color 362A, 362B for each possible illuminant 364A, 364B. Stated in another fashion, a separation distance 570 is assigned to each non-redundant input color 466 based on how far or close the input color 466 is to the closest observable color for 362A, 362B for each possible illuminant 364A, 364B.

For ease of discussion, in FIGS. 5A and 5B, one of the input colors 466 has been labeled a first input color 466A; one of the input colors 466 has been labeled a second input color 466B; one of the input colors 466 has been labeled a third input color 466C; one of the input colors 466 has been labeled a fourth input color 466D; and one of the input colors 466 has been labeled a fifth input color 466E. Further, in FIG. 5A, the closest observable color 362A to the first input color 466A has been labeled 362AA; the closest observable color 362A to the second input color 466B has been labeled 362AB; the closest observable color 362A to the third input color 466C has been labeled 362AC; the closest observable color 362A to the fourth input color 466D has been labeled 362AD; and the closest observable color 362A to the fifth input color 466E has been labeled 362AE. Similarly, in FIG. 5B, the closest observable color 362B to the first input color 466A has been labeled 362BA; the closest observable color 362B to the second input color 466B has been labeled 362BB; the closest observable color 362B to the third input color 466C has been labeled 362BC; the closest observable color 362B to the fourth input color 466D has been labeled 362BD; and the closest observable color 362B to the fifth input color 466E has been labeled 362BE.

Moreover, in FIG. 5A, the control system 232 has determined (i) a first separation distance 570AA between the first input color 466A and its closest observable color 362AA, (ii) a second separation distance 570AB between the second input color 466B and its closest observable color 362AB, (iii) a third separation distance 570AC between the third input color 466C and its closest observable color 362AC, (iv) a fourth separation distance 570AD between the fourth input color 466D and its closest observable color 362AD, and (v) a fifth separation distance 570AE between the fifth input color 466E and its closest observable color 362AE.

Somewhat similarly, in FIG. 5B, the control system 232 has determined (i) a first separation distance 570BA between the first input color 466A and its closest observable color 362BA, (ii) a second separation distance 570BB between the second input color 466B and its closest observable color 362BB, (iii) a third separation distance 570BC between the third input color 466C and its closest observable color 362BC, (iv) a fourth separation distance 570BD between the fourth input color 466D and its closest observable color 362BD, and (v) a fifth separation distance 570BE between the fifth input color 466E and its closest observable color 362BE.

In one non-exclusive example, a small distance can be assigned if the input color is close to an observed color, and a large distance can be assigned if there is no close observed color to the input color. The separation distance 570 can be computed by searching for the minimum chromaticity distance between the input color and the closest observable color. In addition, the separation distance 570 for each input color can be scaled based upon the appropriate brightness level of the input color (e.g. the green channel value) to give more weight for brighter colors as they tend to be more reliable than dark colors. The scaling adjustment can be optional and should be evaluated based on the tradeoff between computational complexity and potential gain in illuminant estimation accuracy.

With this implementation, for example, in FIG. 5A, the control system 232 can determine that (i) the first separation distance 570AA is approximately 0 because the input color 466A overlaps the closest observable color 362AA, (ii) the second separation distance 570AB is approximately 5, (iii) the third separation distance 570AC is approximately 4, (iv) the fourth separation distance 570AD is approximately 10, and (v) the fifth separation distance 570AE is approximately 4.5.

Further, in FIG. 5B, the control system 232 can determine that (i) the first separation distance 570BA is approximately 0 because the input color 466A overlaps the closest observable color 362BA, (ii) the second separation distance 570BB is approximately 0.5 because the input color 466B is very close to the closest observable color 362BB, (iii) the third separation distance 570BC is approximately 2, (iv) the fourth separation distance 570BD is approximately 2, and (v) the fifth separation distance 570BE is approximately 2.

It should be noted that the numbers used as examples for the separation distances used in the previous paragraphs are merely for ease of understanding, and the calculated separation distances can be different than these numbers.

In yet another embodiment, a large distance can be assigned if the input color is close to an observed color and a small distance can be assigned if there is no close observed color to the input color.

FIG. 5C is a chart that includes a matrix of a non-redundant list 571 of input colors and its respective separation distances 570 for a plurality of possible illuminants, including the first possible illuminant 364A and the second possible illuminant 364B.

In this embodiment, the control system 232 determines the separation distance 570 between each input color of the non-redundant set 571 and its closest observable color for each possible illuminant in the illuminant database.

Next, in this embodiment, the control system 232 adds each separation distance for each possible illuminant in the illuminant database to determine a total consistency matching error 572 for each possible illuminant in the illuminant database. After totaling the separation distances 570 for each illuminant, the control system 232 determines which of the possible illuminants has the best total consistency matching error. For example, if a small distance is assigned if the input color is close to an observed color and a large distance is assigned if there is no close observed color to the input color, then the lowest total consistency matching error 572 is the best. In FIG. 5C, the first possible illuminant 364A has a total consistency matching error of 198, the second possible illuminant 364B has a total consistency matching error of 120, and the N possible illuminant has a total consistency matching error of 15. In this example, the N possible illuminant has the lowest and best total consistency matching error.

Alternatively, if a large distance is assigned if the input color is close to an observed color and a small distance is assigned if there is no close observed color to the input color, then the highest total consistency matching error is the best.

With the present method, the control system first determines which of the possible illuminants has the best total consistency matching error. The illuminant with the best total consistency matching error shall be referred to an estimated initial illuminant. In the example provided above, the N possible illuminant has the best total consistency matching error. Thus, the N possible illuminant is the estimated initial illuminant in this example.

With this design, the image apparatus 10 can accurately estimate the initial illuminant of the scene 12 with relatively simple computations. This improves the performance of the image apparatus 10 and reduces the cost to manufacture the control system 232 and the image apparatus 10.

It should be noted that some steps can be added to the algorithm to improve the efficiency of the consistency system in estimating the initial illuminant. For example, there can be some preprocessing methods to sort the observable colors for each possible illuminant. Further, the separation distance between each possible input color and its respective closest observable color for each possible illuminant can be pre-calculated.

Additionally, the present invention can include one or more supplemental procedures that can be used in conjunction with the consistency matching system detailed above to improve the accuracy of the illuminant estimation. More specifically, it is sometimes difficult to distinguish between some possible daylight illuminants ("outdoor illuminants") and some possible fluorescent illuminants ("indoor illuminants"). Moreover, it is sometimes difficult to distinguish between some possible illuminants when the scene 12 (illustrated in FIG. 1) has intrinsic color casting. The methods described herein can supplement the consistency estimation method described above, and/or another type of estimation system. For example, these methods can supplement another type of illuminant gamut mapping estimation system, such as the color by correlation-based system, the gamut-mapping based system, etc. It should be noted that one or both of the supplemental methods can be used by the control system to provide the estimated final illuminant (although these methods may have to be slightly modified in order to generate something similar to the consistency matching methods disclosed herein).

In certain embodiments, the supplemental methods combine the information from the consistency methods with input image color statistics (e.g., a histogram of the input image), and/or apparatus settings (e.g. exposure information) to improve illuminant estimation.

In certain embodiments, if the scene 12 is illuminated with certain indoor illuminants (e.g. a fluorescent illuminant), the consistency method used above (or another method) may incorrectly estimate the initial illuminant to be a daylight illuminant because the color gamut of some fluorescent illuminants is somewhat similar to the color gamut of some daylight illuminants. Somewhat similarly, if the scene 12 is illuminated with certain outdoor illuminants, the consistency method used above (or another method) may incorrectly estimate the initial illuminant to be an indoor illuminant because the color gamut of some fluorescent illuminants is somewhat similar to the color gamut of some daylight illuminants.

As an overview, in one supplemental method, the control system utilizes one or more of the apparatus settings used when capturing the input image to assist in estimating the correct illuminant. Generally, most indoor lighting conditions (fluorescent light) are darker than outdoor, daylight conditions. Accordingly, by evaluating one or more of the apparatus settings, the control system can estimate if the illuminant is an indoor lighting condition or an outdoor, daylight condition.

FIG. 6A is a simplified consistency matching curve 680 that results from a total calculated consistency error of approximately twenty-two possible illuminants for a captured input image (not shown) of a scene (not shown). In this example, the scene was actually illuminated by a fluorescent illuminant (specifically illuminant number 21 and highlighted by a circle), and the consistency error for each possible illuminant was calculated using the consistency matching method described above. As illustrated in FIG. 6A, in this example, possible illuminant number 10 has the best total consistency matching error, and possible illuminant number 21 has the next best consistency matching error. Thus, in this example, possible illuminant number 10 is the estimated initial illuminant.

In this example, the possible illuminant number 10 is a daylight (outdoor) illuminant, while possible illuminant number 21 is a fluorescent (indoor) light. Further, as described above, possible illuminant number 21 is the actual illuminant of the scene. Thus, in this example, the estimated initial illuminant is incorrect.

FIG. 6B is a simplified graph that illustrates both the gamut of observable colors (represented as "*") for illuminant number 21, and the non-redundant input colors (represented as dashed "O") for the input image. Somewhat similarly, FIG. 6C is a simplified graph that illustrates both the gamut of observable colors (represented as "*") for illuminant number 10, and the non-redundant input colors (represented as dashed "O") for the input image. FIGS. 6B and 6C illustrate that the gamut of observable colors for illuminant number 21 is very similar to the gamut of observable colors for illuminant number 10. Thus, it is understandable how the consistency matching method described above incorrectly identified the initial illuminant.

As provided herein, one or more of the methods described herein can be used in conjunction with the consistency matching method by the control system to more accurately estimate the illuminant. In one embodiment, one or more of the apparatus settings (set when capturing the input image) are used to assist in estimating the correct illuminant. In this embodiment, the consistency matching curve 680 and the estimated initial illuminant are determined. Next, if the estimated initial illuminant is among some outdoor conditions or some indoor conditions, the apparatus settings are evaluated to determine if the estimated initial illuminant needs to be adjusted.

For example, if the apparatus settings clearly indicate that the input image was captured outdoors, and the estimated initial illuminant is an outdoors illuminant, then the estimated initial illuminant is selected as the estimated final illuminant. Alternatively, if the apparatus settings clearly indicate that the input image was captured indoors, and the estimated initial illuminant is an outdoors illuminant, then the control system reviews the consistency matching errors for the possible indoor (fluorescent) lights and selects the one with the best matching error as the estimated final illuminant as long as the consistency matching error for that indoor illuminant is somewhat close to the consistency matching error for the estimated initial illuminant. Still alternatively, if the apparatus settings do not give clear indication of the lighting condition, the control system selects the estimated initial illuminant as the estimated final illuminant.

Thus, depending upon how much confidence there is in the lighting condition (towards daylights or indoor lights), and the difference between the best consistency matching error in outdoor illuminants and the best consistency matching error in outdoor illuminants lights, the control system can select the estimated initial illuminant as the estimated final illuminant or switch the estimated initial illuminant to another illuminant.

The exact values for the apparatus settings (i) that clearly indicate outdoor illuminants, or (ii) that clearly indicate indoor illuminants can vary according to the other properties of the image apparatus. In one non-exclusive embodiment, (i) the combination of a relatively short exposure time and a relatively small aperture size would indicate an outdoor illuminant, and (ii) the combination of a relatively long exposure time and a relatively large aperture size would indicate an indoor illuminant.

Alternatively, the control system could evaluate only one of the exposure time and the aperture size to further analyze the lighting conditions.

Referring back to FIGS. 6A-6C, in this example, the actual illuminant (number 21) is fluorescent and the estimated initial illuminant (number 10) is daylight. In this situation, because the scene was illuminated by fluorescent, the apparatus setting should indicate a darker condition and indoor lighting. If this is the case, the control system will evaluate the consistency errors and determine that the consistency error for illuminant (number 21) is very close to the consistency error for the estimated initial illuminant (number 10). Thus, with the apparatus settings indicating indoor, and the close matching error, the control system will select illuminant (number 21) as the estimated final illuminant. Accordingly, the control system will have correctly selected the final illuminant.

Alternatively, if the apparatus settings indicate outdoor lights, the control system will select the estimated initial illuminant as the estimated final illuminant. Still alternatively, if the apparatus settings are too ambiguous, the control system will select the estimated initial illuminant as the estimated final illuminant.

Figure 7A:
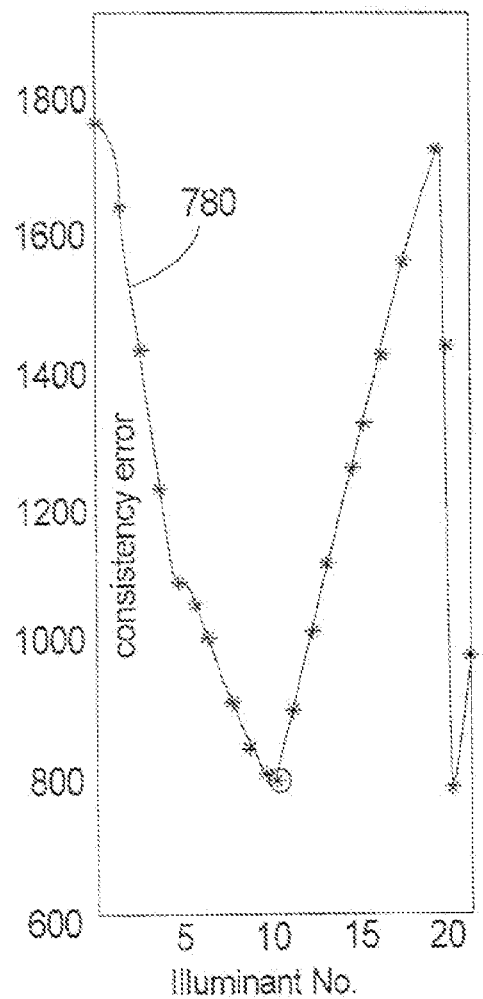
FIG. 7A is a simplified consistency matching curve for a second input image.
Figure 7B:
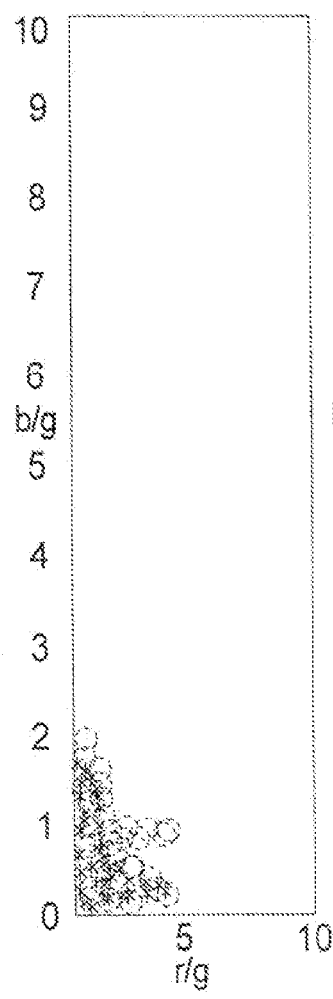
FIG. 7B is a simplified graph that illustrates both the gamut of observable colors for a first illuminant, and non-redundant input colors for the second input image.
Figure 7C:
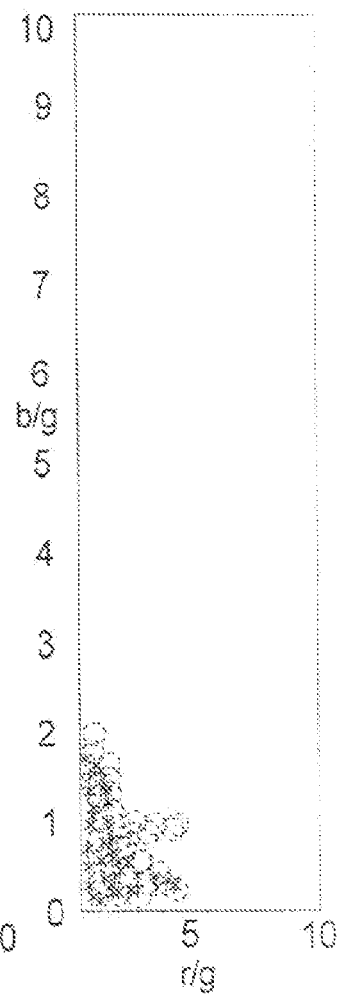
FIG. 7C is a simplified graph that illustrates both the gamut of observable colors for a second illuminant, and non-redundant input colors for the second input image.

FIGS. 7A-7C illustrate another example of how the apparatus settings can be used to fine tune the estimate procedure. More specifically, FIG. 7A is a simplified consistency matching curve 780 that illustrates a total calculated consistency error of approximately twenty-two possible illuminants for a captured input image (not shown) of a scene (not shown). In this example, the scene was actually illuminated by an outdoor illuminant (specifically illuminant number 11, daylight, and highlighted by a circle), and the consistency error for each possible illuminant was calculated using the consistency method described above. As illustrated in FIG. 7A, in this example, possible illuminant number 21 has the best total consistency matching error, and possible illuminant number 11 has the next best consistency matching error. Thus, in this example, possible illuminant number 21 is the estimated initial illuminant.

In this example, possible illuminant number 11 is a daylight illuminant, while possible illuminant number 21 is a fluorescent. Further, as described above, possible illuminant number 11 is the actual illuminant of the scene. Thus, in this example, the estimated initial illuminant is again incorrect.

FIG. 7B is a simplified graph that illustrates both the gamut of observable colors (represented as "*") for illuminant number 11, and the non-redundant input colors (represented as dashed "O") for the input image. Somewhat similarly, FIG. 7C is a simplified graph that illustrates both the gamut of observable colors (represented as "*") for illuminant number 21, and the non-redundant input colors (represented as dashed "O") for the input image. FIGS. 7B and 7C illustrate that the gamut of observable colors for illuminant number 21 is very similar to the gamut of observable colors for illuminant number 11. Thus, it is understandable how the consistency method described above incorrectly identified the initial illuminant.

In this example, one or more of the apparatus settings used when capturing the input image are again used to assist in estimating the correct illuminant. In this embodiment, the consistency matching curve and the estimated initial illuminant are determined. Next, if the estimated initial illuminant is among some indoor or outdoor lighting, the apparatus settings are evaluated to determine if the initial illuminant needs to be adjusted. For example, if the apparatus settings clearly indicate that the input image was captured indoors, and the estimated initial illuminant is an indoor illuminant, then the estimated initial illuminant is selected as the estimated final illuminant. Alternatively, if the apparatus settings clearly indicate that the input image was captured outdoors, and the estimated initial illuminant is an indoor illuminant, then the control system reviews the consistency matching error for the possible outdoor illuminants and if one is located that has a consistency matching error that almost as good as the initial illuminant, then the control system selects that outdoor illuminant as the estimated final illuminant. Still alternatively, if the apparatus settings do not give clear indication of the lighting condition, the control system selects the estimated initial illuminant as the estimated final illuminant.

Thus, depending upon how much confidence there is in the lighting condition (towards outdoor or indoor lights), and the difference between the best consistency matching error in daylights and the best consistency matching error in fluorescent lights, the control system can select the estimated initial illuminant as the estimated final illuminant or switch the estimated initial illuminant to another illuminant.

In this example, the actual illuminant (number 11) is outdoor daylight and the estimated initial illuminant (number 21) is indoor. In this situation, because the scene was illuminated by outdoor daylight, the apparatus setting should indicate a lighter condition and outdoor lighting. If this is the case, the control system will evaluate the consistency errors and determine that the consistency error for illuminant (number 11) is very close to the consistency error for the estimated initial illuminant (number 21). Thus, with the apparatus settings indicating outdoor and the close matching error, the control system will select illuminant (number 11) as the estimated final illuminant. Accordingly, the control system will have correctly selected the final illuminant.

As provided above, it is also sometimes difficult to distinguish between some possible illuminants when the scene 12 (illustrated in FIG. 1) has intrinsic color casting. In another supplemental method, the control system also utilizes the consistency matching curve to detect if the scene has intrinsic color casting. Subsequently, the control system can determine the color of the intrinsic color casting. Next, the control system can adjust the estimated initial illuminant to get the estimated final illuminant.

As a reminder, there are two types of possible color casting, one caused by the illuminant color (illuminant color casting) and a second caused by the colors in the scene (intrinsic color casting). With intrinsic color casting, a scene that only contains green grass will show greenish color casting.

Figure 8A:
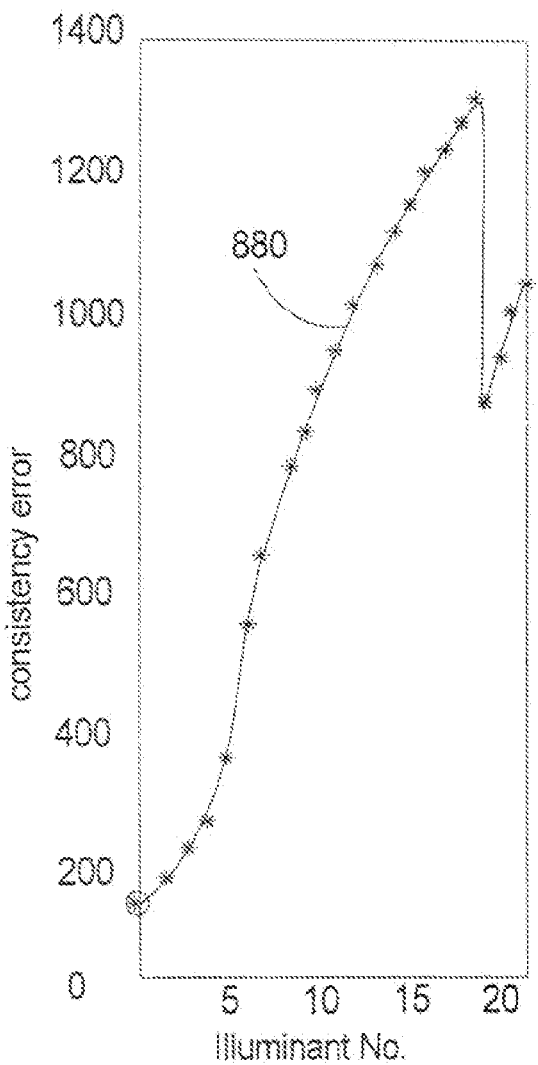
FIG. 8A is a simplified consistency matching curve for a third input image.

For scene with illuminant color casting, the scene typically contains various different colors. As a result thereof, the consistency matching curve will show sharp difference in the consistency matching error for the different illuminants. FIG. 8A is a simplified consistency matching curve 880 that illustrates a total calculated consistency error of approximately twenty-two possible illuminants for a captured input image (not shown) of a scene (not shown). In this example, the consistency error for each possible illuminant was calculated using the consistency method described above. Further, the actual illuminant of the scene is illuminant number 1 (highlighted with a circle). As illustrated in FIG. 8A, in this example, possible illuminant number 1 has the best total consistency error. Thus, in this example, possible illuminant number 1 is the estimated initial illuminant and it is the actual illuminant.

Further, in FIG. 8A, there is a sharp difference in the consistency error for each of the possible illuminants. This indicates that the scene has illuminant color casting and does not have intrinsic color casting.

Figure 8B:
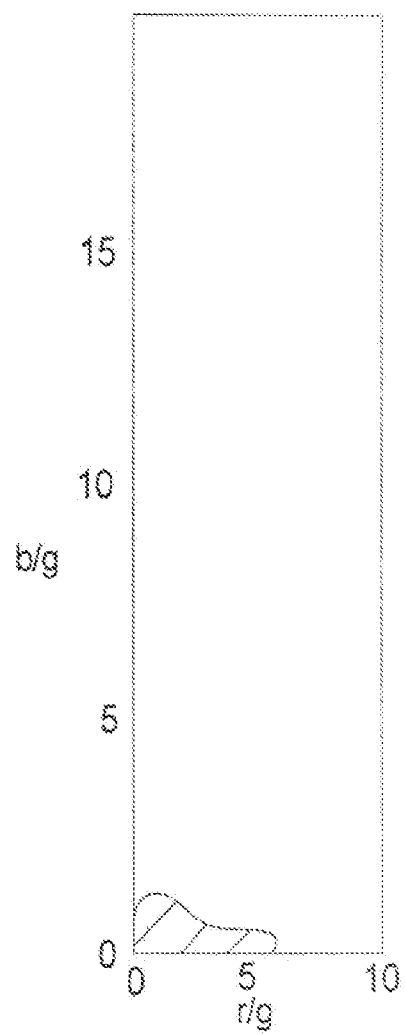
FIG. 8B is a plot of input colors in chromaticity space.

FIG. 8B is a graph that illustrates the color casting information (e.g. color distribution) of this scene. More specifically, FIG. 8B is a plot of input colors in chromaticity space that can be used to detect possible color casting. In this example, the input colors contain a significant amount of red. Thus, the scene has red color casting. However, the plot does not identify if the color casting is caused by illuminant color casting or intrinsic color casting. In addition or alternatively to the plot, a histogram distribution characteristics of the input colors can be used to detect possible color casting.

As detailed above in the discussion of FIG. 8A, in this example, the consistency matching error for the different illuminants can be used to determine if the color casting is caused by illuminant color casting or intrinsic color casting.

Because, the scene in this example has illuminant color casting, there is no need to change the estimated initial illuminant. Thus, if the control system determines that the scene does not have intrinsic color casting, the control system selects the estimated initial illuminant as the estimated final illuminant.

Figure 9A:
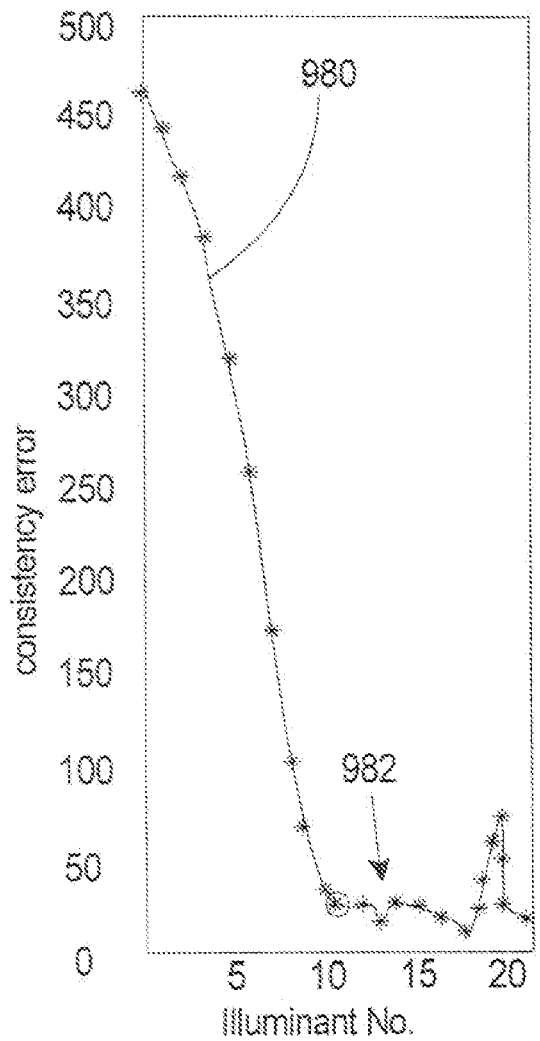
FIG. 9A is a simplified consistency matching curve for a fourth input image.

Alternatively for a scene with intrinsic color casting, the consistency matching curve tends to show a flat region for a range of different illuminants. Stated in another fashion, if the color casting in the scene is caused by the objects in the scene and not the illuminant, a number of the possible illuminants will have approximately the same consistency matching error. FIG. 9A is a simplified consistency matching curve 980 that illustrates a total calculated consistency error of approximately twenty-two possible illuminants for a captured input image (not shown) of a scene (not shown). In this example, the consistency error for each possible illuminant was calculated using the consistency method described above. Further, the actual illuminant of the scene is illuminant number 14 (highlighted with a circle). As illustrated in FIG. 9A, in this example, possible illuminant number 17 has the best total consistency error. Thus, in this example, possible illuminant number 17 is the estimated initial illuminant.

Further, in FIG. 9A, there is a flat region 982 for a range of different illuminants near the illuminant with the best consistency matching error. This indicates that the scene has intrinsic color casting because the color casting in the scene is being caused by the colors in the scene and not the illuminant of the scene.

Figure 9B:
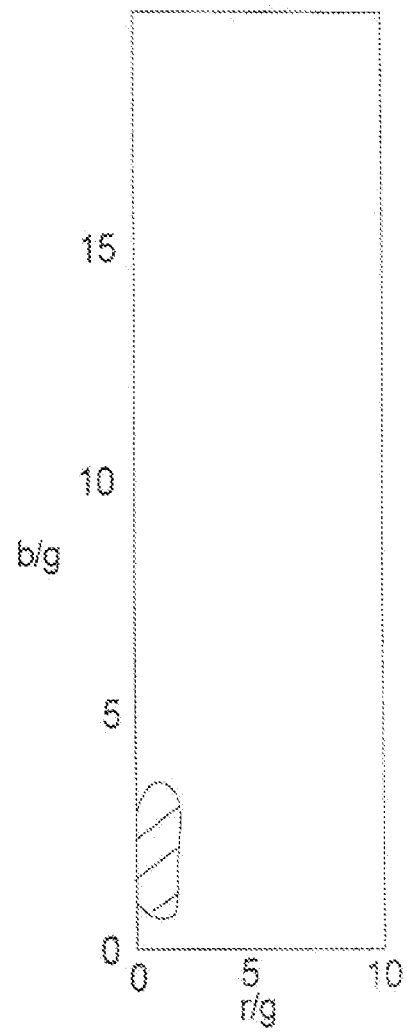
FIG. 9B is a plot of input colors in chromaticity space.

FIG. 9B is a graph that illustrates the color casting of this scene. More specifically, FIG. 9B is a plot of input colors in chromaticity space that can be used to detect possible color casting. This plot can be used to identify the color casting in the scene. In this example, the input color contain a significant about of blue and the scene has blue color casting. However, the plot does not identify if the color casting is caused by illuminant color casting or intrinsic color casting. In addition or alternatively to the plot, a histogram distribution characteristics of the input colors can be used to detect possible color casting.

As detailed above in the discussion of FIG. 9A, in this example, the consistency matching error for the different illuminants can be used to determine if the color casting is caused by illuminant color casting or intrinsic color casting.

Because, the scene in this example has intrinsic color casting, the control system needs to change the estimated initial illuminant. Stated in another fashion, if the control system determines that the scene has intrinsic color casting, the control system (with information regarding the color casting) selects one of the possible illuminants near the estimated initial illuminant as the estimated final illuminant. In one embodiment, the control system determines that the input image contains intrinsic color casting, the control system selects the estimated final illuminant from another illuminant that lies inside the flat region 982 of the consistency matching curve 980.

In this example, it was determined that the scene contains blue intrinsic color casting. As a result thereof, the possible illuminant that was selected as the estimated initial illuminant will have more blue than the actual illuminant of the scene. Thus, the control system will select an estimated final illuminant that lies inside the flat region 982 of the consistency matching curve 980 and that has less blue tint than the estimated initial illuminant. In this example, the color temperature of the estimated final illuminant will be less than the color temperature of the estimated initial illuminant.

Alternatively, if it is determined that the scene contains red intrinsic color casting, the estimated initial illuminant will have more red than the actual illuminant of the scene. Thus, the control system will select an estimated final illuminant that lies inside the flat region 982 of the consistency matching curve 980 and that has less red tint than the estimated initial illuminant. In this example, the color temperature of the estimated final illuminant will be greater than the color temperature of the estimated initial illuminant.

Subsequently, after determining the estimated final illuminant, the control system 232 performs color correction on the input image based on the estimated final illuminant.

It should be noted that intrinsic color casting can be detected in a number of ways. The first way includes the steps of (i) detecting if the consistency matching curve contains a flat region around the lowest matching error or not; (ii) If yes, detecting from the color distribution or chromaticity distribution of the input image to see if color casting exists; and (iii) if yes, the input image contains intrinsic color casting and the potential estimated illuminant lies inside the flat consistency matching curve range. Another way to detect the intrinsic color casting includes the steps of (i) detecting from the color distribution or chromaticity distribution of the input image (input colors) to see if color casting exists, (ii) if yes, the consistency matching curve is reviewed to detect if there exists a flat region around the lowest matching error in the consistency matching curve, and (iii) if yes, the image contains intrinsic color casting and the estimated illuminant is adjusted accordingly.

Figure 10:
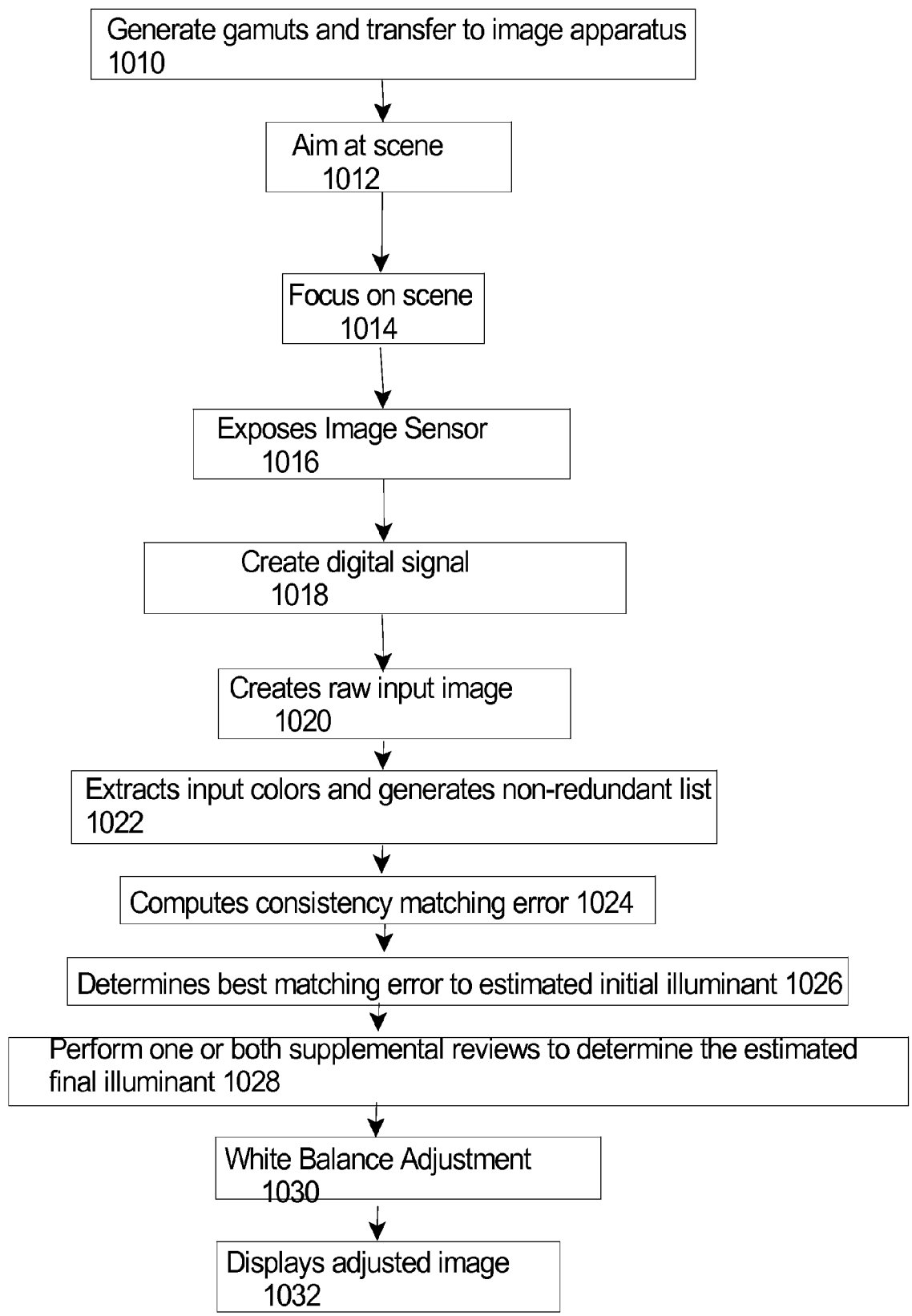
FIG. 10 is a flowchart that illustrates the operation of the image apparatus.

FIG. 10 is a simplified flow chart that further illustrates one non-exclusive example the operation of the image apparatus. It should be noted that one or more of the steps can be omitted or the order of steps can be switched. First, the illuminant gamuts for the desired possible illuminants are generated and are transferred to the image apparatus 1010. Next, the image apparatus is aimed toward the scene 1012. Subsequently, the user presses lightly on the shutter button to enable the image apparatus to automatically focus on the object(s) 1014. Next, the user presses the shutter button all the way, which resets the image sensor, and exposes the image sensor to light 1016. Next, the control system measures the charge at each photosite of the image sensor and creates a digital signal that represents the values of the charge at each photosite 1018. Subsequently, the control system interpolates the data from the different photosites, with assistance from the filtering component, to create the raw input image 1020. Next, the control system extracts the input colors from the input image 1022 and generates a non-redundant list of input colors. Subsequently, the control system computes the consistency matching error for the input colors to each of the illuminant gamuts in the illuminant database 1024. Next, the control system determines the estimated initial illuminant by selecting the possible illuminant with best total consistency error 1026.

Additionally, the control system can perform one or more of the supplemental reviews to determine the estimated final illuminant 1028. In one supplemental method, the control system utilizes one or more of the apparatus settings as described above (e.g. camera exposure settings and matching curve) to determine the estimated final illuminant. In another supplemental method, the control system also utilizes the consistency matching curve to detect if the scene has intrinsic color casting as described above. Subsequently, the control system can determine the color of the intrinsic color casting. Next, the control system can adjust the estimated initial illuminant to get the estimated final illuminant.

Subsequently, the control system performs color correction on the input image based on the estimated final illuminant 1030. Finally, the adjusted image 1032 can be displayed.

Figure 11:
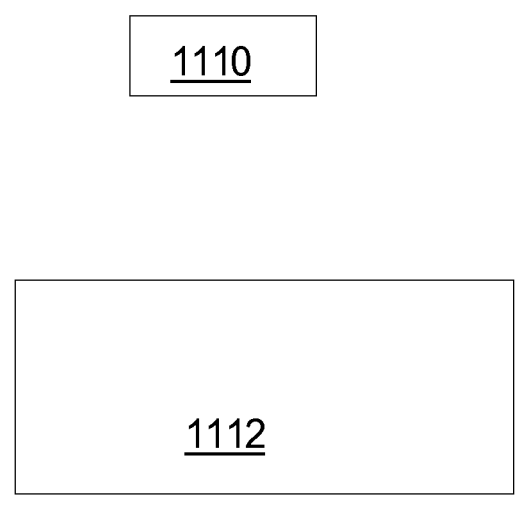

FIG. 11 is a simplified illustration of a combination having features of the present invention, including a camera 1110, and a post-processing adjustment system 1112. In this embodiment, the camera 1110 captures the input image (not shown in FIG. 11) and the adjustment system 1112 estimates the illuminant and performs the appropriate levels of white balance adjustment to the input image. In this embodiment, the adjustment system 1112 includes a control system with software that (i) evaluates the input image to estimate the illuminant, and (ii) performs white balance adjustment on the input image based on the estimated illuminant.

In FIG. 11, the captured image can be transferred to the adjustment system 1112 via an electrical connection line (not shown), a wireless connection, or in another fashion. For example, the camera 1110 can include a removable storage system (not shown in FIG. 11) that is selectively removed from the camera 1110 and inserted into a docking port (not shown) of the adjustment system 1112.

The design of the adjustment system 1112 can be varied. For example, the adjustment system 1112 can be a personal computer that includes the appropriate software.

It should be noted that the methods of estimating the possible illuminant described above can be used in combination with one or more other prior art automatic white balance algorithms. For example, the consistency matching error method disclosed herein can be used in conjunction with a "gray world" illuminant estimation approach, a "white patch" illuminant estimation approach, or variations thereof.

In the "gray world" illuminant estimation approach, it is assumed that for an image of sufficiently varied colors, the average surface reflectance is "gray". Therefore, it simply takes the average colors of the image as the gray color and adjusts the image accordingly.

In the "white patch" illuminant estimation approach, it is assumed that the brightest pixels of an image reflect the actual color of the light source. This would be especially relevant for pixels corresponding to a point on glossy or specular surfaces. This method searches for these pixels and takes them as the scene illuminant color.

While the current invention is disclosed in detail herein, it is to be understood that it is merely illustrative of the presently preferred embodiments of the invention and that no limitations are intended to the details of construction or design herein shown other than as described in the appended claims.

What is claimed is:

1. An image apparatus for providing an estimated final illuminant of a scene, the image apparatus comprising:
    a capturing system that captures an input image of the scene, the input image including a plurality of input colors; and
    a control system that compares at least one of the input colors to an illuminant database that includes an illuminant gamut of observable colors for a plurality of possible illuminants, evaluates if the scene has intrinsic color casting, and, if the scene is determined to have intrinsic color casting, generates a color distribution of the input image to determine a color casting of the input image.

2. The image apparatus of claim 1 wherein the control system determines a separation distance between the at least one input color and a closest observable color for each of the possible illuminants in the illuminant database to obtain a consistency matching error for each of the plurality of possible illuminants, and the control system evaluates the consistency matching error for each of the possible illuminants to determine if the scene has intrinsic color casting.

3. The image apparatus of claim 1 wherein the control system selects the possible illuminant with the best consistency matching error as an estimated initial illuminant and wherein if the control system determines that the scene does not have intrinsic color casting, the control system selects the estimated initial illuminant as the estimated final illuminant.

4. The image apparatus of claim 1 wherein the control system selects the possible illuminant with the best consistency matching error as an estimated initial illuminant and wherein if the control system determines that the scene has intrinsic color casting, the control system selects one of the possible illuminants near the estimated initial illuminant as the estimated final illuminant.

5. The image apparatus of claim 1 wherein the control system evaluates an exposure time of the capturing system to select one of the possible illuminants to be the estimated final illuminant.

6. A method for providing an estimated final illuminant of a scene, the method comprising the steps of:
    capturing an input image of the scene with a capturing system, the input image including a plurality of input colors;
    comparing at least one of the input colors to an illuminant database that includes an illuminant gamut of observable colors for a plurality of possible illuminants with a control system, and
    evaluating if the scene has intrinsic color casting with the control system and, if the scene is determined to have intrinsic color casting, generating a color distribution of the input image to determine a color casting of the input image with the control system.

7. The method of claim 6 wherein the step of comparing includes the step of determining a separation distance between the at least one input color and a closest observable color for each of the possible illuminants in the illuminant database to obtain a consistency matching error for each of the plurality of possible illuminants, and evaluating the consistency matching error for each of the possible illuminants to determine if the scene has intrinsic color casting.

8. The method of claim 7 wherein the step of comparing includes the step of selecting the possible illuminant with the best consistency matching error as an estimated initial illuminant and if the control system determines that the scene does not have intrinsic color casting, the control system selects the estimated initial illuminant as the estimated final illuminant.

9. The method of claim 7 wherein the step of comparing includes the step of selecting the possible illuminant with the best consistency matching error as an estimated initial illuminant and if the control system determines that the scene has intrinsic color casting, the control system selects one of the possible illuminants near the estimated initial illuminant as the estimated final illuminant.

10. An image apparatus for providing an estimated final illuminant of a scene, the image apparatus comprising:
    a capturing system that captures an input image of the scene, the input image including a plurality of input colors including a first input color and a second input color that is different from the first input color; and
    a control system including a processor that accesses an illuminant database that includes a first illuminant gamut for a first illuminant and a second illuminant gamut for a second illuminant, the first illuminant gamut being different from the second illuminant gamut, the first illuminant gamut including a plurality of different first observable colors in the visible spectrum for the first illuminant, and the second illuminant gamut including a plurality of different second observable colors in the visible spectrum for the second illuminant; wherein the control system (i) compares the first input color to the plurality of different first observable colors to determine a first, closest first observable color; (ii) determines a first separation distance between the first input color and the first, closest first observable color; (iii) compares the second input color to the plurality of different first observable colors to determine a second, closest first observable color that is different from the first, closest first observable color; (iv) determines a second separation distance between the second input color and the second, closest first observable color; (v) compares the first input color to the plurality of different second observable colors to determine a first, closest second observable color; (vi) determines a third separation distance between the first input color and the first, closest second observable color; (vii) compares the second input color to the plurality of different second observable colors to determine a second, closest second observable color that is different from the first, closest second observable color; and (viii) determines a fourth separation distance between the second input color and the second, closest second observable color to select one of the first illuminant or the second illuminant to be the estimated final illuminant.

11. The image apparatus of claim 10 wherein the control system (i) calculates a first consistency matching error for the first illuminant using the first separation distance and the second separation distance, and (ii) calculates a second consistency matching error for the second illuminant using the third separation distance and the fourth separation distance.

12. The image apparatus of claim 10 wherein the plurality of possible illuminants includes a plurality of possible indoor illuminants and a plurality of possible outdoor illuminants, and wherein the control system evaluates an apparatus setting of the capturing system when the input image is captured to determine if the apparatus setting indicates an outdoor illuminant or an indoor illuminant.

13. An image apparatus for providing an estimated final illuminant of a scene, the image apparatus comprising:
a capturing system that captures an input image of the scene, the input image including a plurality of input colors including a first input color and a second input color that is different from the first input color; and
a control system including a processor that accesses an illuminant database that includes a first illuminant gamut for a first illuminant and a second illuminant gamut for a second illuminant, the first illuminant gamut being different from the second illuminant gamut, the first illuminant gamut including a plurality of different first observable colors in the visible spectrum for the first illuminant, and the second illuminant gamut including a plurality of different second observable colors in the visible spectrum for the second illuminant; wherein the control system (i) evaluates the plurality of input colors from the input image to create a list of non-redundant input colors, (ii) compares each of the input colors in the list of non-redundant input colors to each of the plurality of different first observable colors in the first illuminant gamut, and (iii) compares each of the input colors in the list of non-redundant input colors to each of the plurality of different second observable colors in the second illuminant gamut to select one of the first illuminant or the second illuminant to be the estimated final illuminant.

14. The image apparatus of claim 13 wherein the control system (i) identifies a separate, closest first observable color from the plurality of different first observable colors in the first illuminant gamut for at least two of the input colors in the list of non-redundant input colors, and (ii) identifies a separate closest second observable color from the plurality of different second observable colors in the second illuminant gamut for at least two of the input colors in the list of non-redundant input colors.

15. The image apparatus of claim 14 wherein the control system (i) determines a separate, first separation distance between each closest first observable color and its corresponding input color; and (ii) determines a separate, second separation distance between each closest second observable color and its corresponding input color.

16. The image apparatus of claim 13 wherein the control system (i) compares the first input color to the plurality of different first observable colors to determine a first, closest first observable color; (ii) compares the second input color to the plurality of different first observable colors to determine a second, closest first observable color that is different from the first, closest first observable color; (iii) compares the first input color to the plurality of different second observable colors to determine a first, closest second observable color; and (iv) compares the second input color to the plurality of different second observable colors to determine a second, closest second observable color that is different from the first, closest second observable color.

17. The image apparatus of claim 16 wherein the control system (i) determines a first separation distance between the first input color and the first, closest first observable color; (ii) determines a second separation distance between the second input color and the second, closest first observable color; (iii) determines a third separation distance between the first input color and the first, closest second observable color; and (iv) determines a fourth separation distance between the second input color and the second, closest second observable color.

18. The image apparatus of claim 17 wherein the control system (i) calculates a first consistency matching error for the first illuminant using the first separation distance and the second separation distance, and (ii) calculates a second consistency matching error for the second illuminant using the third separation distance and the fourth separation distance.

19. The image apparatus of claim 18 wherein the control system evaluates at least one of the consistency matching errors to determine if the scene has intrinsic color casting.

20. A method for providing an estimated final illuminant of a scene, the method comprising the steps of:
capturing an input image of the scene with a capturing system, the entire input image including a plurality of input colors including a first input color and a second input color that is different from the first input color;
accessing an illuminant database that includes a first illuminant gamut for a first illuminant and a second illuminant gamut for a second illuminant using a control system having a processor, the first illuminant gamut being different from the second illuminant gamut, the first illuminant gamut including a plurality of different first observable colors in the visible spectrum for the first illuminant, and the second illuminant gamut including a plurality of different second observable colors in the visible spectrum for the second illuminant;
evaluating the plurality of input colors including the first and second input colors from the input image with the control system to create a list of non-redundant input colors; and
comparing each of the input colors including the first and second input colors in the list of non-redundant input colors to each of the plurality of different first observable colors in the first illuminant gamut with the control system, and comparing each of the input colors including the first and second input colors in the list of non-redundant input colors to each of the plurality of different second observable colors in the second illuminant gamut with the control system to select one of the first illuminant or the second illuminant to be the estimated final illuminant.

21. A method for providing an estimated final illuminant of a scene, the method comprising the steps of:

capturing an input image of the scene with a capturing system, the entire input image including a plurality of input colors including a first input color and a second input color that is different from the first input color;

accessing an illuminant database that includes a first illuminant gamut for a first illuminant and a second illuminant gamut for a second illuminant using a control system having a processor, the first illuminant gamut being different from the second illuminant gamut, the first illuminant gamut including a plurality of different first observable colors in the visible spectrum for the first illuminant, and the second illuminant gamut including a plurality of different second observable colors in the visible spectrum for the second illuminant; and selecting one of the first illuminant or the second illuminant to be the estimated final illuminant by (i) comparing the first input color to the plurality of different first observable colors to determine a first, closest first observable color with the control system; (ii) determining a first separation distance between the first input color and the first, closest first observable color with the control system; (iii) comparing the second input color to the plurality of different first observable colors to determine a second, closest first observable color that is different from the first, closest first observable color with the control system; (iv) determining a second separation distance between the second input color and the second, closest first observable color with the control system; (v) comparing the first input color to the plurality of different second observable colors to determine a first, closest second observable color with the control system; (vi) determining a third separation distance between the first input color and the first, closest second observable color with the control system; (vii) comparing the second input color to the plurality of different second observable colors to determine a second, closest second observable color that is different from the first, closest second observable color with the control system; and (viii) determining a fourth separation distance between the second input color and the second, closest second observable color with the control system.

22. The method of claim 21 further comprising the steps of (i) calculating a first consistency matching error for the first illuminant with the control system using the first separation distance and the second separation distance, and (ii) calculating a second consistency matching error for the second illuminant with the control system using the third separation distance and the fourth separation distance.

* * * * *